United States Patent
Yamada

(10) Patent No.: US 6,587,216 B1
(45) Date of Patent: Jul. 1, 2003

(54) IMAGE-FORMING METHOD AND DEVICE

(75) Inventor: Tsutomu Yamada, Shiojini (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/368,237

(22) Filed: Aug. 4, 1999

(30) Foreign Application Priority Data

Aug. 10, 1998 (JP) .......................................... 10-226362

(51) Int. Cl.$^7$ .............................................. G06K 15/00
(52) U.S. Cl. ..................................... 358/1.11; 358/1.13
(58) Field of Search .............................. 358/1.11, 1.13, 358/1.2, 1.18, 1.16, 3.31, 462, 470; 345/619, 629, 634, 636, 660, 685; 382/301

(56) References Cited

U.S. PATENT DOCUMENTS 5,404,436 A * 4/1995 Hamilton ..................... 345/472

FOREIGN PATENT DOCUMENTS

| JP | 63-162256 | 7/1988 | ............. B41J/3/12 |
| JP | 05238068 | 9/1993 | ............. B41J/2/51 |
| JP | 07081174 | 3/1995 | ............ B41J/21/00 |
| JP | 10058757 | 3/1998 | ............. B41J/3/36 |

* cited by examiner

*Primary Examiner*—Arthur G. Evans
(74) *Attorney, Agent, or Firm*—Hogan & Hartson, LLP

(57) ABSTRACT

There are provided an image-forming method and device. There are defined a plurality of conversion modes to be selectively employed for converting character codes to character image data items each representative of a character image based on an outline font. The conversion modes including at least one partial conversion mode for carrying out conversion of each of the character codes such that only a required portion of each of the character image data items corresponding to the each of the character codes is obtained when at least one of at least one fully-converting condition peculiar to each of the conversion modes is not fulfilled in converting the each of the character codes. A selected one of the conversion modes is set to an actual conversion mode. An image-forming range is set in a whole image represented by whole image data to be created by converting at least one character code to character image data and arranging the character image data. Partial image data representative of part or a whole of the whole image is formed by conversion of each character code in the actual conversion mode, the each character code belonging to the at least one character code and corresponding to character image data representative of a character image part or a whole of which lies within the image-forming range, and arrangement of image data resulting from the conversion within a predetermined partial image data-forming area.

28 Claims, 19 Drawing Sheets

F I G. 1
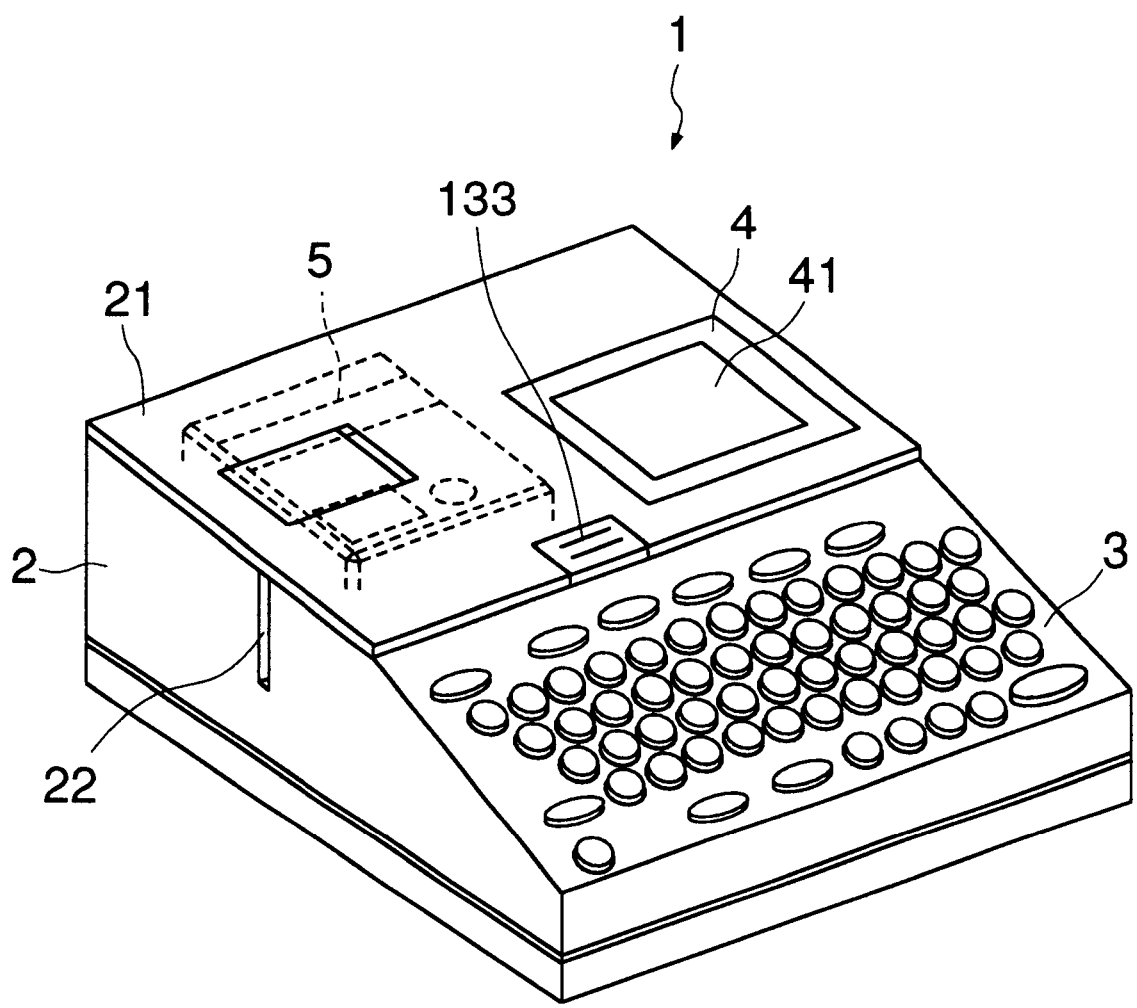

FIG. 6A  FIG. 6B  FIG. 6C
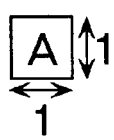
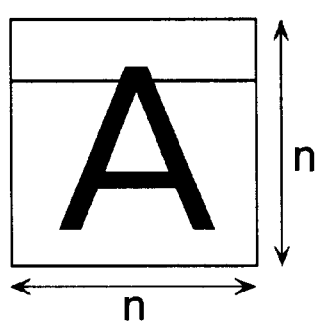
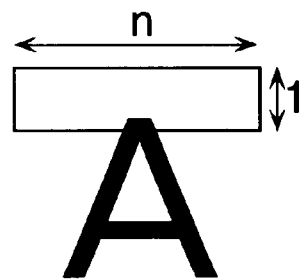
FIG. 6D
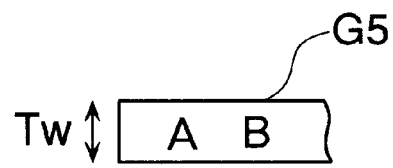

F I G. 1 2
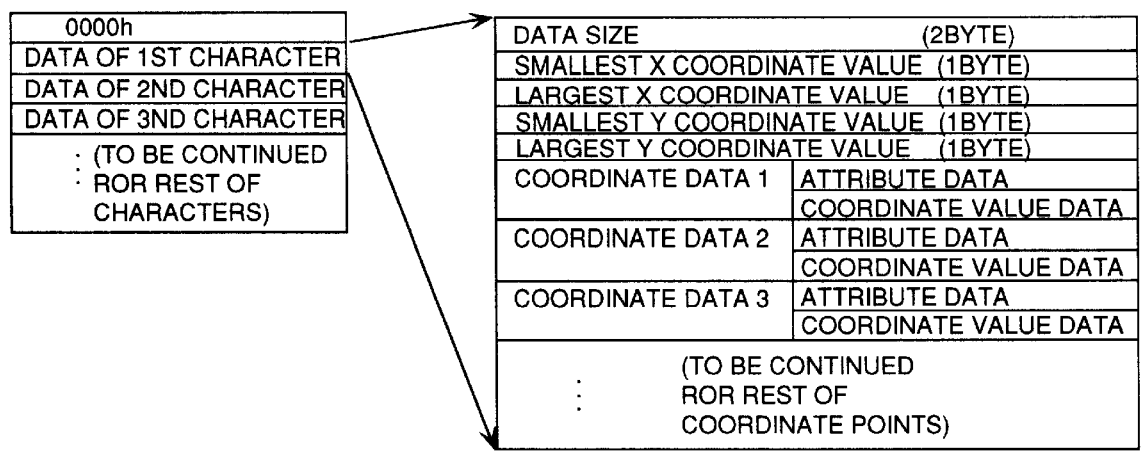

F I G. 1 3

| ITEM | | SIZE (BYTE) | CONTENTS |
|---|---|---|---|
| DATA SIZE | | 2 | • DATA SIZE FOR ONE CHARACTER IS SET.<br>• SUM TOTAL OF DATA SIZE+SMALLEST X COORDINATE VALUE+LARGEST X COORDINATE VALUE+SMALLEST Y COORDINATE VALUE+LARGEST Y COORDINATE VALUE+ATTRIBUTE DATA+COORDINATE VALUE DATA |
| SMALLEST X COORDINATE VALUE | | 1 | • SMALLEST X COORDINATE VALUE OF CHARACTER FORMING POINTS IS SET. |
| LARGEST X COORDINATE VALUE | | 1 | • LARGEST X COORDINATE VALUE OF CHARACTER FORMING POINTS IS SET. |
| SMALLEST Y COORDINATE VALUE | | 1 | • SMALLEST Y COORDINATE VALUE OF CHARACTER FORMING POINTS IS SET. |
| LARGEST Y COORDINATE VALUE | | 1 | • LARGEST Y COORDINATE VALUE OF CHARACTER FORMING POINTS IS SET. |
| COORDINATE DATA | ATTRIBUTE DATA | 1~2 | • CONSTRUCTED BY FORMAT ATTRIBUTE VALUE AND LINE WIDTH ATTRIBUTE VALUE.<br>• SIZE IS SET AT FIRST BYTE.<br>• FORMAT ATTRIBUTE VALUE IS REPRESENTATIVE OF COMPRESSION FORMAT OF COORDINATE VALUE DATA., AND DEFINED BY MORE SIGNIFICANT 4BITS.<br>• LINE WIDTH ATTRIBUTE VALUE IS DEFINED BY LESS SIGNIFICANT 4BITS. |
| | COORDINATE VALUES | 1~3 | • COMPRESSED DATA IN WHICH ACTUAL COORDINATE VALUES ARE COMPRESSED ACCORDING TO FORMAT ATTRIBUTE.<br>• RANGE OF COORDINATE VALUES IS 0 TO 255. |

IMAGE-FORMING METHOD AND DEVICE

BACKGROUND OF THE INVENTION

1. Field of the Invention

This invention relates to a method and device for forming part or a whole of a whole image by converting character codes of characters, such as letters, numerals, and simple figure, to data of character images representative of the characters, based on a predetermined font, and properly arranging the data.

2. Prior Art

Generally, to print or display an image of characters, such as letters, numerals, symbols, simple figures, etc., or a character string formed by arranging the characters, it is required to read out font data corresponding to the text data (character code) of each character from a ROM or the like storing predetermined font data, and then, based on the font data, convert the character code to data representative of a character image and arrange the data of the character image in a predetermined area of a memory, thereby forming print image data or display image data as whole image data representative of the whole image.

As fonts (font data) for converting character codes to data of character images, there have been conventionally employed a dot font in which each character image is represented by a set of pixels (dots) in a manner defined by a dot matrix (bitmap font) of a predetermined size, and an outline font in which each character image is defined by the coordinates of several reference points for forming contour lines of the image, the attributes of lines (straight lines or curves) connecting the reference points to each other, etc.

The dot font provides images of characters fixed in size, and hence to print characters (character images) having various sizes in a clear and attractive manner, it is required to store font data suitable for each of the sizes for use, which necessitates a very large memory capacity. To enlarge each character image, i.e. to form an enlarged image, by using only dot font data of a predetermined size, it is required to replace one image pixel of each original character image by a plurality of image pixels. On the other hand, in forming a reduced image, image pixels have to be thinned.

In these cases, curved portions of the resulting character images are jagged, and to remove jaggedness from them, there is carried out a replacement process, in which blank pixels and image pixels at the curved portions are replaced by each other in a manner adjusted to the original curve such that the curved portion is smoothed. That is, so-called smoothing has to be carried out. However, the smoothing is complicated processing, and it is difficult to form a neater image than an image formed based on the outline font discussed hereafter.

The outline font provides character images each defined by the coordinates and attributes of contour lines thereof. Hence, the dot matrix of a character image having a desired size can be determined simply by converting the character code to image data corresponding thereto according to the desired size. That is, the font data as reference is expanded or reduced in size by calculation during the conversion of the character code, so that a clear enlarged or reduced image can be formed by converting the character code of the original character image and arranging the updated character image according to the expanded or reduced size of the same.

Therefore, when a character image is enlarged or reduced to display or print the same, i.e. when the enlarging/reducing processing of a display image or a print image is required, outline fonts are generally used. Further, display devices and printing apparatuses necessitating the above processing are generally provided with a ROM or the like for storing outline fonts.

However, when character images are displayed or printed, it can be preferable to form a partial image (part of the whole of the character images), e.g. when only part of character images can be displayed due to a limited area of the display screen or limited printing area of the printing object, or when it is desired to intentionally display or print part of the original character image (partial image) by enlarging/reducing the same, or when a combined image is desired to be formed by combining a plurality of character images.

In such cases, when the apparatus employs the conventional enlarging/reducing method, it is required to form a whole image in a dot matrix larger or smaller in size than the original image, and then cut out part of the whole image in the form of a smaller dot matrix. This necessitates an extra capacity of the memory for an unused portion of the whole image. For instance, when a combined image is desired to be formed from portions of a plurality of character images, all of the character images are formed by conversion from their character codes, and a required portion of each character image is extracted and arranged within an area for the combined image. This requires a markedly increased capacity of memory.

This inconvenience imposes limitations on the functions and performance of an inexpensive and small-sized apparatus, such as a tape printing apparatus and a stamp image-forming apparatus, which is provided with a display device and printing device as described above. On the other hand, it is the small-sized apparatus of this kind that requires the function of forming a partial image due to limited area of the display screen and limited printing area of a printing object.

Further, if the original character image is in a dot matrix, to enlarge/reduce part of the same, it is only required to cut out (extract) a required portion from the original character image as data in a dot matrix, and carry out the same enlarging/reducing processing as carried out when the whole image is enlarged/reduced in size.

Therefore, in the case of small-sized apparatuses which makes use of the outline font in normal display or printing, especially when a partial image of an enlarged image is formed, a whole image of each character image which can be displayed by the capacity of memory is formed first, and then cut out (extract) and enlarge part of the whole image. Further, in forming a combined image, the forming of a whole image and extraction of a required portion thereof is executed sequentially on each of all of the character images to store only a required portion of each whole image, so as to reduce the capacity of memory necessitated at one time.

However, in these cases, as described above, the smoothing of a curved portion becomes required. This makes the overall processing complicated, and what is worse, enlarged images and combined images thus produced are less attractive in appearance than when the outline font is utilized.

SUMMARY OF THE INVENTION

It is an object of the invention to provide an image-forming method and device which is capable of forming part or a whole of a whole image comprised of at least one character image formed by converting respective character code(s) to image data and arranging the image data, as an attractive image while saving or reducing the capacity of memory.

To attain the above object, according a first aspect of the invention, there is provided a method of forming an image, comprising the steps of:

defining a plurality of conversion modes to be selectively employed for converting character codes to character image data items each representative of a character image based on an outline font, the conversion modes including at least one partial conversion mode for carrying out conversion of each of the character codes such that only a required portion of each of the character image data items corresponding to the each of the character codes is obtained when at least one of at least one fully-converting condition peculiar to each of the conversion modes is not fulfilled in converting the each of the character codes, setting a selected one of the conversion modes to an actual conversion mode;

setting an image-forming range in a whole image represented by whole image data to be created by converting at least one character code to character image data and arranging the character image data; and forming partial image data representative of part or a whole of the whole image by conversion of each character code in the actual conversion mode, the each character code belonging to the at least one character code and corresponding to character image data representative of a character image part or a whole of which lies within the image-forming range, and arrangement of image data resulting from the conversion within a predetermined partial image data-forming area.

To attain the object, according to a second aspect of the invention, there is provided an image-forming device comprising:

outline font-storing means for storing an outline font;

conversion mode-defining means for defining a plurality of conversion modes to be selectively employed for converting character codes to character image data items each representative of a character image based on an outline font, the conversion modes including at least one partial conversion mode for carrying out conversion of each of the character codes such that only a required portion of each of the character image data items corresponding to the each of the character codes is obtained when at least one of at least one fully-converting condition peculiar to each of the conversion modes is not fulfilled in converting the each of the character codes;

conversion mode-setting means for setting a selected one of the conversion modes to an actual conversion mode;

image-forming range-setting means for setting an image-forming range in a whole image represented by whole image data to be created by converting at least one character code to character image data and arranging the character image data; and partial image data-forming means for forming partial image data representative of part or a whole of the whole image by conversion of each character code in the actual conversion mode, the each character code belonging to the at least one character code and corresponding to character image data representative of a character image part or a whole of which lies within the image-forming range, and arrangement of image data resulting from the conversion within a predetermined partial image data-forming area.

According to this image-forming method and device therefor, a partial image can be formed by setting a conversion mode for converting character codes to character images and an image-forming range for forming a partial image, and out of character images to be arranged when a whole image is formed, converting each character code corresponding to each character image part or all of which is within the image-forming range to data representative thereof in the set conversion mode based on an outline font and properly arranging the data. This method employs the outline font (data), and hence it is possible to form an attractive partial image. Further, by setting one of at least one partial conversion modes, only a required portion of each character image can be converted (partially converted) from its character code when the fully-converting conditions including a condition that a whole of the character image is required, are not fulfilled, so that an extra capacity of memory for storing an unrequired portion of the desired image becomes unnecessary, which makes it possible to save or reduce the capacity of memory.

Preferably, the at least one partial conversion mode includes an enlarged image mode in which an enlarged image to be formed by enlarging at least one character image represented by the character image data corresponding respectively to the at least one character code is set to the whole image, the at least one fully-converting condition for the enlarged image mode including a condition that a whole of the enlarged image lies within the image-forming range.

According to this preferred embodiment of each aspect of the invention, the at least one partial conversion mode includes an enlarged image mode, and the fully-converting conditions include a condition that a whole of the enlarged image lies within the image-forming range. In other words, even when the enlarged image mode is employed in which an enlarged image is set to the whole image, if the whole of the enlarged image is not necessary (the fully-converting conditions are not fulfilled), a required portion of the enlarged image can be formed as the partial image. In such a case, according to the method and device of the preferred embodiment, only data of the required portion of each enlarged character image is formed by converting its character code thereto, so that an extra capacity of memory for storing an unrequired portion of an image becomes unnecessary, which makes it possible to save or reduce the capacity of memory.

Preferably, the at least one partial conversion mode includes a partial image mode in which the partial image data is formed as data representative of the part of the whole image, the at least one fully-converting condition for the partial image mode including a condition that a whole of the whole image lies within the image-forming range.

According to this preferred embodiment of each aspect of the invention, a partial image mode can be set for forming part of the whole image as the partial image, and the fully-converting conditions for this mode include a condition that the whole of the whole image lies within the image-forming range. That is, the partial image can be formed only by setting the partial image mode and the image-forming range therefor. In this case, unless the whole of the whole image is set to the image-forming range, the fully-converting conditions are not fulfilled, and hence only data of a required portion of an image of characters is partially converted from respective character codes, so that an extra capacity of memory for storing an unrequired portion of the image becomes unnecessary, which makes it possible to save or reduce the capacity of memory.

Preferably, the step of forming the partial image data includes the steps of:

setting a layout of the part or the whole of the character image represented by the character image data corresponding to the each character code within the image-forming range, the layout including a size of the part or the whole of the character image within the image-forming range and an arrangement area for the part or the whole of the character image within the predetermined partial image data-forming area; and converting the each character code based on the outline font such that a required portion of the character image data representative of the character image is obtained, when a selected one of the at least one partial conversion mode is set, and arranging the required portion of the character image data in the arrangement area, to thereby form the partial image data within the predetermined partial image data-forming area.

Preferably, the partial image data-forming means includes:

layout-setting means for setting a layout of the part or the whole of the character image represented by the character image data corresponding to the each character code within the image-forming range, the layout including a size of the part or the whole of the character image within the image-forming range and an arrangement area for the part or the whole of the character image within the predetermined partial image data-forming area; and partial image data conversion/arrangement means for converting the each character code based on the outline font such that a required portion of the character image data representative of the character image is obtained, when a selected one of the at least one partial conversion mode is set, and arranging the required portion of the character image data in the arrangement area, to thereby form the partial image data within the predetermined partial image data-forming area.

According to these preferred embodiments, a layout is set which includes a size of the part or the whole of the character image within the image-forming range and an arrangement area for the part or the whole of the character image within the predetermined partial image data-forming area. Each character code is converted based on the outline font such that a required portion of the character image data representative of the character image is obtained, when a selected one of the at least one partial conversion mode is set. The required portion of the character image data is arranged in the arrangement area. This makes it possible to form data of an attractive partial image within the predetermined partial image data-forming area. Further, by partially converting character codes to obtain only the required portion of the character image, it is possible to save or reduce the capacity of memory.

More preferably, the at least one fully-converting condition for the selected one of the at least one partial conversion mode includes a condition that as to the each character code, a whole of the character image data corresponding to the each character code is required to form the partial image data, and at the same time, the whole of the character image data can be arranged within the arrangement area.

According to this preferred embodiment of each aspect of the invention, when the whole of a character image is not required in forming the partial image, or when the whole of the character image cannot be arranged in the arrangement area, the fully-converting conditions are not fulfilled. When these fully-converting conditions are not fulfilled, the full conversion of character codes corresponding to the character images is wasteful, and by the partial conversion to form the required portion of the character images, it is possible to save or reduce the capacity of memory.

More preferably, the step of converting the each character code such that a required portion of the character image data representative of the character image is obtained, and arranging the required portion in the arrangement area includes the step of converting a single character code such that a required portion of character image data corresponding to the single character code is obtained, and directly arranging the required portion of the character image data within the arrangement area.

More preferably, the partial image data conversion/arrangement means includes partial conversion means for converting a single character code such that a required portion of character image data corresponding to the single character code is obtained, and directly arranging the required portion of the character image data within the arrangement area.

According to these preferred embodiments, data of only the required portion of character image is formed by conversion of the single character code to image data and direct arrangement of the image data within the arrangement area. This makes it possible to save or reduce the capacity of memory, and by repeating the above process by the number of times corresponding to the number of characters, the partial image can be formed.

More preferably, the partial image data-forming area contains a conversion area allocated for converting a single character code to character image data corresponding to the single character code and storing the character image data corresponding to the single character code therein;

the step of converting the each character code such that a required portion of the character image data representative of the character image is obtained, and arranging the required portion in the arrangement area includes the steps of:

converting the single character code such that a required portion of character image data corresponding to the single character code is obtained, and storing the required portion of the character image data corresponding to the single character code, in the conversion area; and arranging the required portion of the character image data stored in the conversion area, within the arrangement area.

More preferably, the partial image data-forming area contains a conversion area allocated for converting a single character code to character image data corresponding to the single character code and storing the character image data corresponding to the single character code therein;

the partial image data conversion/arrangement means includes:

partial conversion means for converting the single character code such that a required portion of character image data corresponding to the single character code is obtained, and storing the required portion of the character image data corresponding to the single character code, in the conversion area; and character image data arrangement means for arranging the required portion of the character image data stored in the conversion area within the arrangement area.

According to these preferred embodiments, each single character code corresponding to the required portion of the character image is converted to image data, and the image data is arranged in the arrangement area. By repeating the above process by the number of times equal to the number of characters, data representative of the partial image can be formed.

Further preferably, the at least one fully-converting condition for the selected one of the at least one partial conversion mode includes a condition that the each character code can be converted such that a whole of the character image data representative of the character image corresponding to the each character code can be stored in the conversion area.

According to this preferred embodiment of each aspect of the invention, if a character code cannot be converted such that a whole of the character image represented by the character image data corresponding to the each character code can be stored in the conversion area, the fully-converting conditions are not fulfilled, so that by partially converting the character codes to obtain data of the required portions of the character images, the capacity of memory can be saved or reduced. That is, by allocating the conversion area according to the size of the character images, which is frequently employed, it becomes unnecessary to store an extra area only for storing data of enlarged character images which are less frequently used, whereby it is possible to save or reduce the capacity of memory. Further, to store data of character images which are formed by conversion of character codes and exceed in size the conversion area, in the conversion area, it is only required to partially convert the character codes, and this does not occur so often, causing no significant problem to the overall processing speed.

Further preferably, the step of converting a single character code such that a required portion of character image data corresponding to the single character code is obtained, and directly arranging the required portion of the character image data within the arrangement area includes the steps of:

defining a contour line of a whole of a character image represented by character image data to be formed from the single character code, as an imaginary contour line, assuming that the single character code is converted based on the outline font such that the whole of the character image represented by the character image data is obtained;

determining an actual contour line from the imaginary contour line, the actual contour line being part of the imaginary contour line within a partial conversion range defining a required portion of the character image data corresponding to the single character code, and arranging actual contour pixels forming the actual contour line; and arranging pixels within an area enclosed by the actual contour pixels to thereby form image data constituted by the arranged pixels including the actual contour pixels, as image data to which the single character code is partially converted.

Further preferably, the partial conversion means includes:

imaginary contour line-defining means for defining a contour line of a whole of a character image represented by character image data to be formed from the single character code, as an imaginary contour line, assuming that the single character code is converted based on the outline font such that the whole of the character image represented by the character image data is obtained;

actual contour pixels-arranging means for determining an actual contour line from the imaginary contour line, the actual contour line being part of the imaginary contour line within a partial conversion range defining a required portion of the character image data corresponding to the single character code, and arranging actual contour pixels forming the actual contour line; and partially-converted image data pixels-arranging means for arranging pixels within an area enclosed by the actual contour pixels to thereby form image data constituted by the arranged pixels including the actual contour pixels, as image data to which the single character code is partially converted.

According to these preferred embodiments, to form data of the required portion of a single character image, the contour line of the whole of a character image to be formed by conversion (full conversion) of the character code based on the outline font is defined as an imaginary contour line, and only a portion of the imaginary contour line within the partial conversion range is determined to be an actual contour line. Then, actual contour pixels forming the actual contour line and pixels within an area enclosed by the actual contour pixels are arranged. Thus, the required portion of the character image can be formed by the partial conversion of the character codes.

Still further preferably, the step of defining the contour line of the whole of the character image represented by the character image data to be formed includes the steps of:

reading data of the outline font corresponding to the single character code; and converting contour coordinates included in the read data of the outline font to ones adapted to the size of the part or the whole of the character image represented by the character image data corresponding to the single character code within the image-forming range, the size being included in the layout.

Still further preferably, the imaginary contour line-defining means includes:

outline font-reading means for reading data of the outline font corresponding to the single character code; and contour coordinates conversion means for converting contour coordinates included in the read data of the outline font to ones adapted to the size of the part or the whole of the character image represented by the character image data corresponding to the single character code within the image-forming range, the size being included in the layout.

According to these preferred embodiments, to define the imaginary contour line, data of the outline font corresponding to the single character code is read, and contour coordinates included in the read data of the outline font are converted to ones adapted to the size of the part or the whole of the character having been set in respect of layout. Therefore, the imaginary contour line can be defined by using a contour line formed by the conventional method of converting character codes to character image data.

Still further preferably, the step of determining the actual contour line and arranging the actual contour pixels forming the actual contour line includes the steps of:

calculating coordinates of a position of each of imaginary contour pixels forming the imaginary contour line based on contour coordinates and attributes defining the imaginary contour line;

determining whether or not the coordinates of the position of the each of the imaginary contour pixels are within the partial conversion range; and arranging each of ones of the imaginary contour pixels, of which the coordinates of the position are determined to be within the partial conversion range, in the position indicated by the coordinates, as the actual contour pixels forming the actual contour line.

Still further preferably, the actual contour pixels-arranging means includes:

imaginary contour pixel position-calculating means for calculating coordinates of a position of each of imaginary contour pixels forming the imaginary contour line based on contour coordinates and attributes defining the imaginary contour line;

actual contour pixel-determining means for determining whether or not the coordinates of the position of the each of the imaginary contour pixels are within the partial conversion range; and actual contour pixel-arranging means for arranging each of ones of the imaginary contour pixels, of which the coordinates of the position are determined to be within the partial conversion range, in the position indicated by the coordinates, as the actual contour pixels forming the actual contour line.

According to these preferred embodiments, to arrange the actual contour pixels, coordinates indicative of the position of each of imaginary contour line pixels forming the imaginary contour line are calculated based on the contour coordinates and attributes defining the imaginary contour line, and as to each of the pixels, it is determined whether or not coordinates of the position of the each of the imaginary contour pixels are within the partial conversion range. Each of ones of the imaginary contour pixels, of which the coordinates of the position are determined to be within the partial conversion range, is arranged in the position indicated by the coordinates, as the actual contour pixels forming the actual contour line. Therefore, it is possible to arrange the actual contour pixels forming the actual contour line of the partially-converted image of character images.

Preferably, the partial image data is formed as print image data representative of a print image to be printed on a printing object.

According to this preferred embodiment of each aspect of the invention, the partial image data is formed as print image data representative of a print image to be printed on a printing object. Therefore, this embodiment can be applied to a printing apparatus or the like, as the method and device for forming a print image.

Preferably, the printing object is a tape.

According to this preferred embodiment of each aspect of the invention, the printing object on which the partial image formed as the print image is a tape. This makes it possible to apply the method and device according to the embodiment to a tape printing apparatus.

Preferably, the partial image data is formed as display image data representative of a display image to be displayed on a display screen.

According to this preferred embodiment of each aspect of the invention, the partial image is formed as display image data representative of a display image to be displayed on a display screen. Therefore, this embodiment can be applied to a display device or the like as the method and device for forming a display image.

The above and other objects, features, and advantages of the invention will become more apparent from the following detailed description taken in conjunction with the accompanying drawings.

BRIEF DESCRIPTION OF THE DRAWINGS

FIG. 1 is a perspective view of an appearance of a tape printing apparatus to which is applied an image-forming method and device according to an embodiment of the invention;

FIG. 6A is a diagram which is useful in explaining a conversion area required for storage of a character image normally converted from a character code;

FIG. 6B is a diagram which is useful in explaining a conversion area required for storage of a character image enlargingly converted from the character code;

FIG. 6C is a diagram which is useful in explaining a conversion area required for storing part of an enlarged character image partially converted from the character code;

FIG. 6D is a diagram which is useful in explaining a print image printed in normal printing;

FIG. 12 is a diagram showing a data format of an example of outline font data;

FIG. 13 is a table which is useful in explaining contents defined by each data item appearing in FIG. 12;

DETAILED DESCRIPTION

The invention will now be described in detail with reference to the drawings showing an embodiment thereof. In the embodiment, an image-forming method and device according to the invention is applied to a tape printing apparatus.

Figure 2:
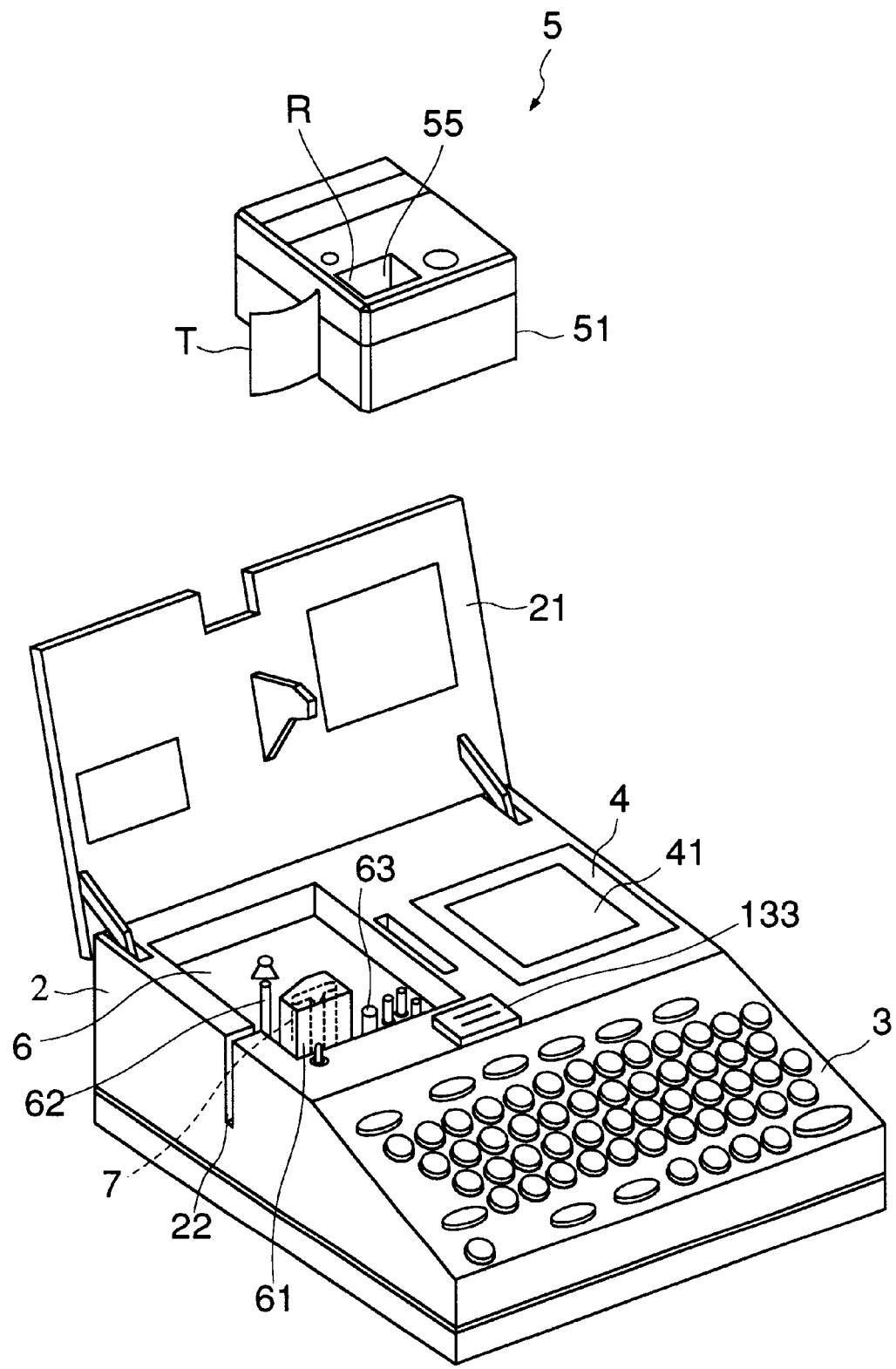
FIG. 2 is a perspective view of the FIG. 1 tape printing apparatus with a lid thereof opened and a tape cartridge removed therefrom.
Figure 3:
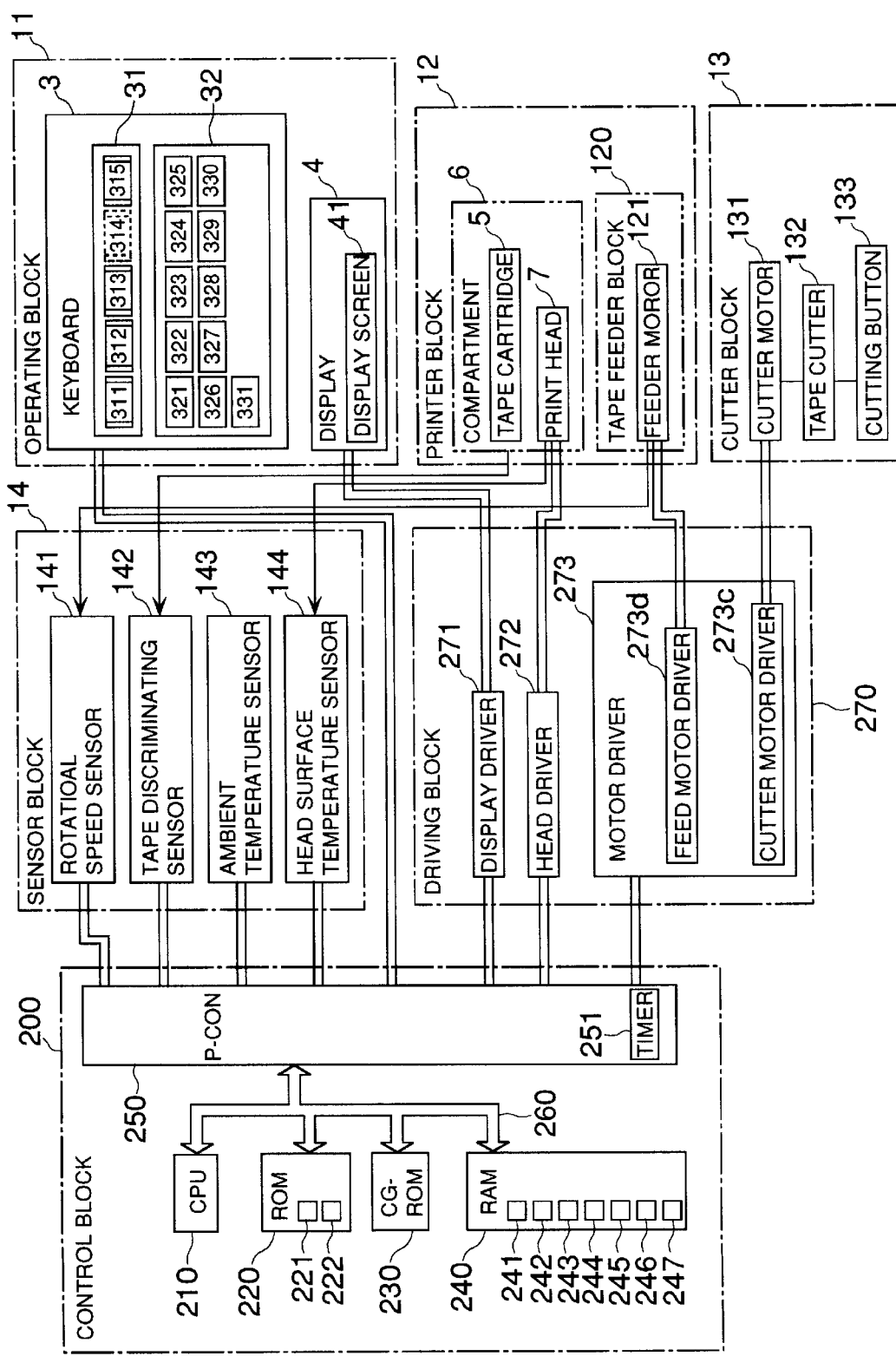
FIG. 3 is a block diagram of the control system of the FIG. 1 tape printing apparatus.

FIG. 1 is a perspective view of an appearance of the whole tape printing apparatus, and FIG. 2 is a perspective view of the FIG. 1 tape printing apparatus with its lid open. FIG. 3 is a block diagram schematically showing a control system of the FIG. 1 tape printing apparatus.

As shown in FIGS. 1 and 2, the tape printing apparatus 1 includes a casing 2 having upper and lower divisional portions. The casing 2 has a keyboard 3 arranged on the top of the front portion thereof, a lid 21 attached to the top of the rear portion thereof, and a display 4 arranged in a window formed in the right-hand side of the lid 21. The keyboard 3 is comprised of various kinds of entry keys.

Further, as shown in FIG. 3, the tape printing apparatus 1 is basically comprised of an operating block 11 having the keyboard 3 and the display 4 for interfacing with the user, a printer block 12 having a print head 7 and a tape feeder block 120 for printing on a tape T unwound from the tape cartridge 5 loaded in a compartment 6, a cutter block 13 for cutting off the printed portion of the tape T, a sensor block 14 having various sensors for carrying out various detecting operations, a driving block 270 having drivers for driving circuits of blocks and devices, and a control block 200 for controlling operations of components of the tape printing apparatus 1 including the above-mentioned sensors and drivers.

To implement the above construction, the casing 2 accommodates a circuit board, not shown, in addition to the printer block 12, the cutter block 13, the sensor block 14 and so forth. On the circuit board are mounted a power supply unit and the circuits of the driving block 270 and the control block 200. The circuit board is connected to a connector port for connecting an AC adapter thereto, and batteries, such as nicad batteries, which can be removably mounted within the casing 2 from outside.

In the tape printing apparatus 1, after loading the tape cartridge 5 in the compartment 6, the user enters printing information, such as desired characters (letters, numerals, symbols, simple figures, etc.) via the keyboard 3, while confirming or viewing the results of the entry and editing operations of the printing information on the display 4. Thereafter, when the user instructs a printing operation via the keyboard 3, the tape feeder block 120 unwinds a tape T from the tape cartridge 5, while the print head 7 prints on the tape T. The printed portion of the tape T is delivered from a tape exit 22 as the printing proceeds. When the desired printing operation is completed, the tape feeder block 120 sends the tape T to a position corresponding to termination of a tape length (the length of a label to be formed) including the length of margins, and then stops the feeding of the tape.

As shown in FIGS. 2 and 3, the printer block 12 has the compartment 6 arranged under the lid 21 for loading the tape cartridge 5 therein. The tape cartridge 5 is mounted in or removed from the compartment 6 when the lid 21 is open.

The tape cartridge 5 has a cartridge casing 51 holding a tape T and an ink ribbon R both having a predetermined width (approximately 4.5 to 48 mm). The tape cartridge 5 is formed with a through hole 55 for receiving therein a head unit 61 arranged in the compartment 6. Further, the tape cartridge 5 has a plurality of small holes formed in the bottom thereof for discrimination of a type of the tape T contained therein from the other types of the tape T having different widths, which are contained in other tape cartridges 5. The compartment 6 has a tape-discriminating sensor 142, such as micro-switches or the like, for detecting the above holes to thereby determine the type of the tape T set for use.

The tape T has an adhesive surface on the reverse side which is covered with a peel-off paper. The tape T and the ink ribbon R are fed or run such that they pass by the through hole 55, in a state lying one upon the other, and the tape T alone is delivered out of the tape cartridge 5, but the ink ribbon R is taken up into a roll within the tape cartridge 5.

The head unit 61 contains the print head 7 formed of a thermal head. The print head 7 abuts the reverse side of the ink ribbon R exposed to the through hole 55 of the tape cartridge 5 when the tape cartridge 5 is loaded in the compartment 6 with the print head 7 fitted in the through hole 55. Then, by driving the print head 7 while heating the same, desired letters and the like are printed on the surface of the tape T.

The compartment 6 is provided with an ambient temperature sensor 143, such as a thermistor, which sends information of an ambient temperature detected thereby to a control block 200. Further, the casing 2 has a left side portion thereof formed with a tape exit 22 for causing the compartment 6 and the outside of the apparatus to communicate with each other. On the tape exit 22 faces a tape cutter 132 for cutting off a dispensed portion of the tape T.

Further, the compartment 6 is provided with drive shafts 62, 63 for engagement with driven portions of the tape cartridge 4 loaded in the compartment 6. These drive shafts 62, 63 cause the tape T and the ink ribbon R to be fed or advanced in the tape cartridge 5 by using a feed motor 121 as a drive source therefor, and at the same time the print head 7 is driven in synchronism with the feeding of the tape and ribbon to thereby carry out printing. Further, after completion of the printing operation, the tape T continues to be fed to bring a predetermined cutting position (corresponding to the tape length) on the tape T to the position of the tape cutter 132.

It should be noted that a head surface temperature sensor 144 formed e.g. by a thermistor, is arranged on a surface of the print head 7 in a manner intimately contacting the surface, which sends information of the surface temperature of the print head 7 detected thereby to the control block 200. The feed motor 121 has an end thereof rigidly fixed to a disc, not shown, formed with detection openings, and a rotational speed sensor 141 including a photo sensor or the like is provided to face the path of the detection openings, for sending information of the rotational speed of the feed motor 121 detected thereby to the control block 200.

The cutter block 13 includes a tape cutter 132, a cutting button 133 to be operated manually for causing the tape cutter 132 to cut the tape T e.g. in the case of a desired length printing, and a cutter motor 131 for automatically driving the tape cutter 132 to cut the tape T e.g. in the case of a fixed length printing. To selectively carry out one of the two cutting operations, the tape printing apparatus 1 is capable of switching between a manual cutting mode and an automatic cutting mode in response to a mode-setting operation.

More specifically, in the manual cutting mode, when the printing operation is completed, the user pushes the cutting button 133 arranged on the casing 2, whereby the tape cutter 132 is actuated to cut the tape T to a desired length. On the other hand, in the automatic cutting mode, after completion of the printing operation, the tape T is sent for incremental feed by the length of a rear margin, and then stopped, whereupon the cutter motor 131 is driven to cut off the tape T.

The sensor block 14 includes the rotational speed sensor 141, the tape-discriminating sensor 142, the ambient temperature sensor 143 and the head surface temperature sensor 144. It should be noted that the above sensors can be omitted to suit the actual requirements of the tape-printing apparatus.

The driving block 270 includes a display driver 271, a head driver 272 and a motor driver 273.

The display driver 271 drives the display 4 of the operating block 11 in response to control signals delivered from the control block 200, i.e. in accordance with commands carried by the signals. Similarly, the head driver 272 drives the print head 7 of the printer block 12 in accordance with commands from the control block 200.

Further, the motor driver 273 has a feed motor driver 273d for driving the feed motor 121 of the printer block 12 and a cutter motor driver 273c for driving the cutter motor 131 of the cutter block 13, and similarly to the display driver 271 and the head driver 272, drives each motor in accordance with commands from the control block 200.

The operating block 11 includes the keyboard 3 and the display 4. The display 4 has a display screen 41 which is capable of displaying display image data of 96×64 dots on a rectangular display area of approximately 6 cm in the horizontal direction (X direction)×4 cm in the vertical direction (Y direction). The display 4 is used by the user to enter data via the keyboard 3 to form or edit print image data, such as character string image data, view the resulting data, and enter various commands including ones for selecting menu options via the keyboard 3.

On the keyboard 3 there are arranged a character key group 31 including an alphabet key group 311, a symbol key group 312, a number key group 313, and a nonstandard character key group 315 for calling nonstandard characters for selection, as well as a function key group 32 for designating various operation modes. In a type of the apparatus which is capable of entering the Japanese language, there is also provided a kana key group 314 for entering Japanese hirakana letters and Japanese katakana letters.

The function key group 32 includes a power key 321, a print key 322 for instructing a printing operation, a selection key 323 for finally determining entry of character data and feeding lines during text entry as well as determining selection of one of modes on a selection screen, a color specification key 324 for specifying printing colors including neutral colors (mixed colors) of print image data, a color-setting key 325 for setting colors of characters and background colors, and four cursor keys 330 (up arrow key 330U, down arrow key 330D, left arrow key 330L, and right arrow key 330R) for moving the cursor or the display range of print image data on the display screen 41 in respective upward, downward, leftward, and rightward directions.

The function key group 32 also includes a cancel key 326 for canceling instructions, a shift key 327 for use in changing roles of respective keys as well as modifying registered image data, an image key 328 for alternately switching between a text entry screen or a selection screen and a display screen (image screen) for displaying print image data, a proportion-changing (zoom) 329 key for changing a proportion between the size of print image data and the size of display image data displayed on the image screen, and a form key 331 for setting formats of labels to be formed.

Similarly to keyboards of the general type, the above key entries may be made by separate keys exclusively provided therefor or by a smaller number of keys operated in combination with the shift key 327 or the like. Here, for purposes of ease of understanding, the following description will be made assuming that there are provided as many keys as described above.

As shown in FIG. 3, from the keyboard 3, various commands described above and data are input to the control block 200.

The control block 200 includes a CPU 210, a ROM 220, a character generator ROM (CG-ROM) 230, a RAM 240, a peripheral control circuit (P-CON) 250, all of which are connected to each other by an internal bus 260.

The ROM 220 has a control program area 221 for storing control programs executed by the CPU 210 as well as a control data area 222 for storing control data including a color conversion table, a character modification table and the like.

The CG-ROM 230 stores font data, i.e. data defining characters, symbols, figures and the like, provided for the tape printing apparatus 1. When code data for identifying a character or the like is input thereto, it outputs the corresponding font data.

The RAM 240 is supplied with power by a backup circuit, not shown, such that stored data items can be preserved even when the power is turned off by operating the power key 321. The RAM 240 includes areas of a register group 241, a text data area 242 for storing text data of letters or the like entered by the user via the keyboard 3, a display image data area 243 for storing image data displayed on the display screen 41, a print image data area 244 for storing print image data, a registered image data area 245 for storing registered image data, as well as a print record data area 246 and conversion buffer areas 247 including a color conversion buffer. The RAM 240 is used as a work area for carrying out the control process.

The P-CON 250 incorporates a logic circuit for complementing the functions of the CPU 210 as well as dealing with interface signals for interfacing between the CPU 210 and peripheral circuits. The logic circuit is implemented by a gate array, a custom LSI and the like. For instance, a timer 251 is incorporated in the P-CON 250 for the function of measuring elapsed time.

Accordingly, the P-CON 250 is connected to the sensors of the sensor block 14 and the keyboard 3, for receiving the above-mentioned signals generated by the sensor block 14 as well as commands and data entered via the keyboard 3, and inputting these to the internal bus 260 directly or after processing them. Further, the P-CON 250 cooperates with the CPU 210 to output data and control signals input to the internal bus 260 by the CPU 210 or the like, to the driving block 270 directly or after processing them.

The CPU 210 of the control block 200 receives the signals from the sensor block 14, and the commands and data input via the keyboard 3 via the P-CON 250, according to the control program read from the ROM 220, processes font data from the CG-ROM 230 and various data stored in the RAM 240, and delivers control signals to the driving block 270 via the P-CON 250 to thereby carry out position control during printing operations, the display control of the display screen 41, and the printing control that causes the print head 7 to carry out printing on the tape T under predetermined printing conditions. In short, the CPU 210 controls the overall operation of the tape printing apparatus 1.

Next, the overall control process carried out by the tape printing apparatus 1 will be described with reference to FIG. 4. As shown in the figure, when the program for carrying out the control process is started e.g. when the power of the tape printing apparatus 1 is turned on, first, at step S1, initialization of the system including restoration of saved control flags is carried out to restore the tape printing apparatus 1 to the state it was in before the power was turned off the last time. Then, the image that was displayed on the display screen 41 before the power was turned off the last time is shown as the initial screen at step S2.

Figure 4:
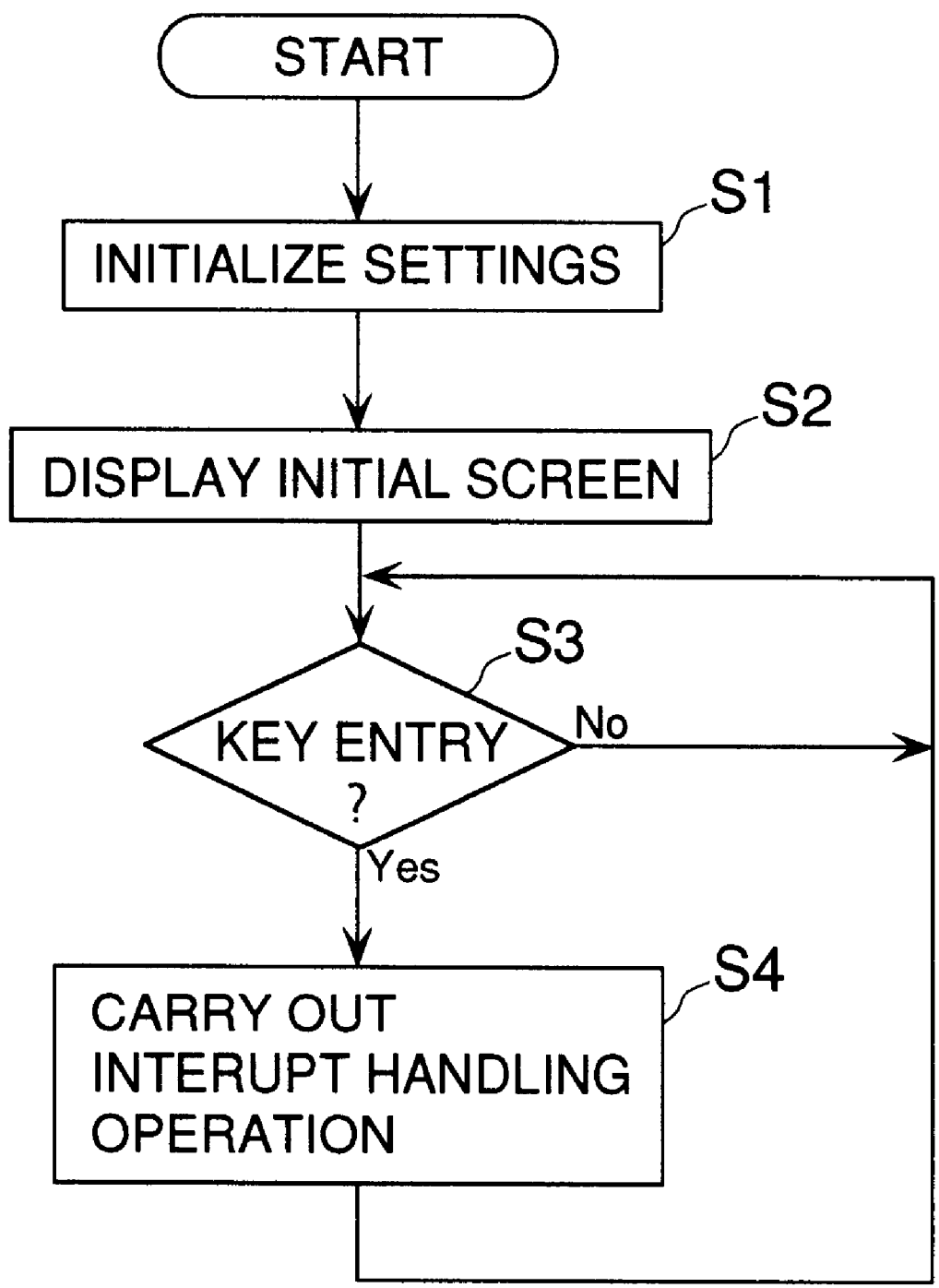
FIG. 4 is a flowchart showing a conceptual representation of an overall control process executed by the FIG. 1 tape printing apparatus.

The following steps in FIG. 4, that is, step S3 for determining whether or not a key entry has been made and step S4 for carrying out an interrupt handling operation are conceptual representations of actual operations. Actually, when the initial screen has been displayed at step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at step S4, and after the interrupt handling routine is terminated, the key entry wait state is again enabled and maintained (No to S3).

As described above, in the tape printing apparatus 1, main processing operations by the apparatus are carried out by interrupt handling routines, and hence if print image data for printing is provided or has been prepared, the user can print the image data at a desired time point, by depressing the print key 322 to thereby generate an interrupt by the print key and start a printing process. In short, operating procedures up to the printing operation can be selectively carried out by the user as he desires.

Further, in the tape printing apparatus 1, when a function key of the function key group 32 for selectively designating a control mode or the like is depressed, an interrupt by the function key is generated to start a corresponding interrupt handling routine, and a selection screen corresponding to the depression of the selected function key is displayed on the display screen 41 of the display 4. When such a selection screen for selecting control modes etc. is displayed on the display screen 41, any of a plurality of options of control modes displayed on the selection screen can be displayed in reverse video i.e. highlighted by operating the cursor key 330. Then, by depressing the selection key 323 in this state, the highlighted option can be selected.

Now, a selection operation in the tape printing apparatus 1 will be described by taking one carried out for enlarged image-printing described hereinafter, as an example.

For instance, when the form key 331 is depressed in the key entry wait state described above with reference to FIG. 4 (No to S3), an interrupt by the form key 331 is generated to start a format-selecting process, and a selection screen for selecting formats is displayed on the display screen 41. By operating the cursor key 330 in this state to highlight, e.g. an option of "print format" and then depressing the selection key 323, the option of "print format" is selected, and then, a selection screen for selecting print formats is displayed (hereinafter "highlighting an option by operating the cursor key 330 and selecting the option by operating the selection key 323" is simply referred to as "selecting").

When an option of "enlarged image-printing", for instance, is selected from various options ("normal printing" is among the other options) in the state of the "print format" selection screen being displayed, an enlarged image-printing mode is set and an enlargement ratio-setting screen is displayed for setting an enlargement ratio n. In this state, the enlargement ratio n can be input by depressing a desired one of the number key group 313.

Assuming that a number key of "4", for instance, is depressed, in this case, the number "4" is entered as the enlargement ratio n, and a message is displayed, which notifies that the enlargement ratio n is set to 4. If the setting of the enlargement ratio n to 4 is desired to be canceled, the cancel key 326 is depressed and a different number is entered by operating another number key, whereas if the setting of the enlargement ratio n to 4 is approved, the selection key 323 is depressed to thereby finally determine entry of the enlargement ratio n to set the same to 4. Then, the format-selecting process is terminated to display a text entry screen as the basic screen, followed by returning to the key entry wait state (No to S3).

Next, the relationship between an image represented by print image data formed in the enlarged image-printing operation described hereinbelow and the capacity of the memory device of the apparatus will be described with reference to FIGS. 5A, 5B and 6A to 6D.

Figures 5A, 5B:
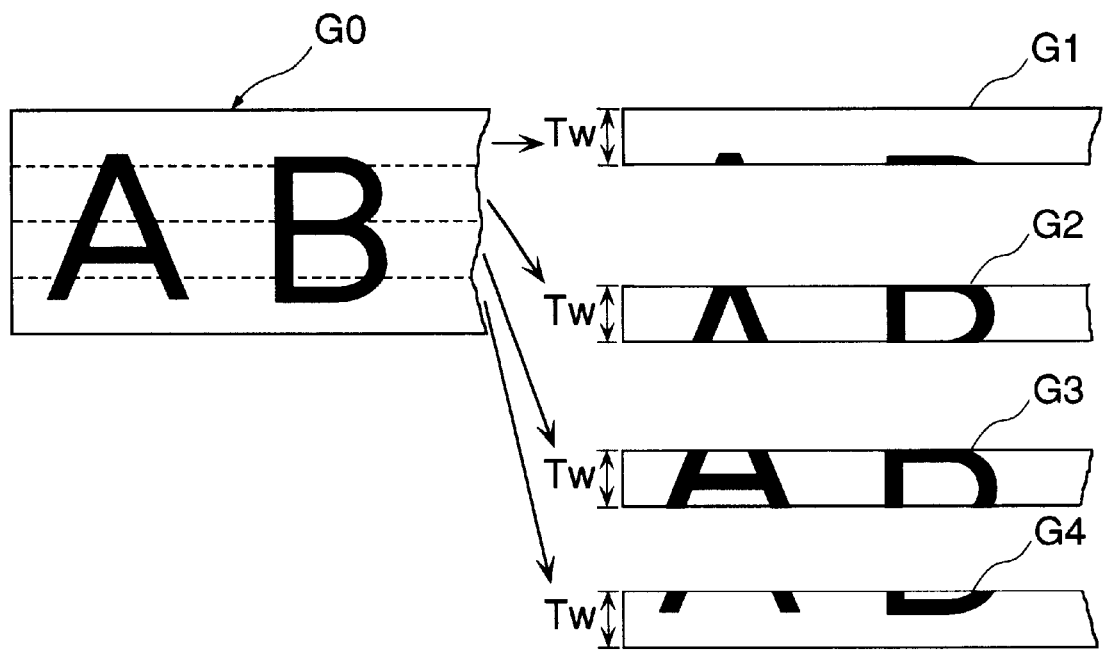
FIG. 5A is a diagram which is useful in explaining a whole image used as a print image (image to be printed) in enlarged image-printing.
FIG. 5B is a diagram which is useful in explaining partial images (split images) used as print images in enlarged image-printing.

Let it be assumed that when the enlargement ratio n is set to 1 (i.e. the normal printing is executed), a tape T having a tape width Tw is large enough to print a character string "AB . . . " of a normal (reference) size, and that a tape cartridge 5 containing the tape T is loaded in the compartment. Even when the enlargement ratio n=4, for instance, is set for carrying out printing, if the character string "AB . . . " can be split to be printed on four tapes T, as shown in FIGS. 5A and 5B, it is possible to print the whole of a character string enlarged by a factor of 4.

In the above case, as shown in FIGS. 6A to 6D, assuming that the size of a conversion area required for storage of data (dot matrix data) of the character "A" converted (normally converted) from a character code based on a reference size, for instance, is defined as 1×1 [=an enlargement ratio of horizontal size (corresponding to a size along length of the tape T)×an enlargement ratio of vertical size (corresponding to a size along width of the tape T); i.e. a ratio obtained when the reference size is set to a value of 1] (see FIG. 6A), the conversion area for simply storing data of the character "A" converted from the character code according to the enlargement ratio n (n=4, for instance), is required to have a size of n×n (=16) times as large as that of the normal conversion area) (see FIG. 6B).

On the other hand, by simply setting the vertical size of the character to one as large as a size required for the normal conversion (see FIG. 6C), it is possible to reduce the size of the conversion area to 1/n times the size of the FIG. 6B conversion area, whereby the capacity of the memory device can be saved. In other words, if data representative of only part (1/n) of the character image (partial image) can be converted (partially converted) from the character code instead of the whole character image (see FIG. 6B), the capacity of the memory device required for storage can be saved accordingly.

Of course, if data representative of the character image is partially converted from the character code such that the data is stored in a conversion area having a size as large as the size (1×1) of the normal conversion area, the capacity of the memory device can be further saved. As described hereinbelow, this can be carried out by setting the size of a memory area allocated to a character image conversion/storage area to the same size (1×1) that is required for the normal conversion. However, normally, in the tape printing apparatus, predetermined margins are arranged above and below each character image and thereafter, a normal printing operation is carried out to obtain a printed image, e.g. as shown in FIG. 6D. Therefore, overall processing can be quickly carried out by converting character codes such that data of portions of respective character images extending continuously in the horizontal direction are stored at a time. Therefore, in the following, description is made assuming that a conversion area having an area size n×1 times as large as that of the normal conversion area is allocated, as described above with reference to FIG. 6C.

As described above with reference to FIGS. 5A and 5B, if an enlarged image G0 shown in FIG. 5A is split into four split images G1 to G4, as shown in FIG. 5B, and the split images are sequentially printed on respective four strips of a tape T having a tape width Tw, the whole of the enlarged image G0 can be eventually printed. In this process, when the split image G1, for instance, is to be printed as a first printing range, referred to hereinbelow, it is only required to prepare data of the split image G1. That is, data of the other split images G2 to G3 are not required for printing on a first strip of the tape T.

Further, for instance, there can be a case in which only a desired one of split images is printed as part of a decoration or the like. That is, there can be a case in which only the split image G2, for instance, is required but other split images are not required. If such a need can be expected, e.g. in the above case where the enlargement ratio n=4 is input and entry thereof is finally determined, the display 4 may be changed to a selection screen, via which an option it can be selected and determined concerning whether or not the whole of the enlarged image (G1 to G4: the first to fourth of the four split images) which is n=4 times as large as the reference-size character image is required, or which split image(s) is/are required when only part of the enlarged image is desired, thereby permitting the user to arbitrarily select settings for such printing.

When the whole of an enlarged image is not required, as shown in the above example, only data of a necessitated portion of the enlarged image (for instance, the split image G1 used in the first printing operation) may be formed as data of a partial image. In such a case (when the split image G1 is created, for instance), by converting (partially converting) a character code into only data of a required portion of an enlarged character image, it is made unnecessary to store data of an unrequired portion of the enlarged character image, which enables the capacity of the memory device to be saved.

As described hereinabove, according to the tape printing apparatus 1, the "normal printing mode" and the "enlarged image-printing mode" can be selected from a plurality of options displayed in the "print format" selection screen. When the enlarged image-printing mode is selected for setting the same, if at least one of fully-converting conditions is not fulfilled, an image conversion mode for converting a character code such that data of only a required part of a character image is obtained (partial conversion mode) is set. It should be noted that the fully-converting conditions include, for instance, a condition of the whole of an enlarged image being set to an image-forming range, which is fulfilled e.g. when a tape T having a width large enough to print the whole enlarged image thereon is loaded in the apparatus (the other conditions will be described hereinafter). From the viewpoint of the conversion mode, the enlarged image-printing mode is an enlarged image mode and included in the partial conversion mode.

Further, according to the tape printing apparatus 1, in addition to the above enlarged image-printing (enlarged image) mode, various kinds of modes included in the partial conversion mode can be set. For instance, as modes concerning the aforementioned "print format", it is possible to set a "partial image-printing mode" (partial image mode) for printing only part of a whole image (including the above enlarged image) as a partial (split) image regardless of the tape width Tw or the enlargement ratio n (or a reduction ratio), a "synthesized image-printing mode" (synthesized image mode) for synthesizing portions of a plurality of images which can be formed respectively by converting a plurality of groups of character data (text data) and arranging the resulting images, and printing the synthesized image, and a "high-density printing mode", described hereinafter, for carrying out high-density printing.

Further, on a format selection screen located at an upper level than the "print format" selection screen, it is possible to select a "display format" for forming and displaying enlarged, reduced, split (partial), or synthesized partial images as display images. An enlarged image display mode belongs to the enlarged image mode, similarly to the above enlarged image-printing mode, from the viewpoint of the conversion mode, and hence is included in the partial conversion mode. Further, a split (partial) image display mode belongs to the partial image mode, similarly to the partial image-printing mode, and a synthesized image display mode belongs to the synthesized image mode, similarly to the synthesized image-printing mode. The split (partial) image display mode and the synthesized image display mode are also included in the partial conversion mode. Further, the tape printing apparatus 1 is configured such that the operation modes thereof can be set not only by using the selection screens, but also by operating function keys. For instance, the enlarged image display (enlarged image) mode can be set by operating the zoom key 329.

For instance, a partial image can be formed only by setting the partial image mode, such as the above partial image-printing mode or the partial image display mode, and setting an image-forming range therefor. The fully-converting conditions, i.e. conditions to be fulfilled to permit a character code to be converted such that data of a whole image is stored as it is, include one that the whole of a whole image is set to an image-forming range. In other words, unless the whole of the whole image is determined to be within an image-forming range, the fully-converting conditions are not fulfilled, and hence data of a character image is partially converted from its character code as required, thereby making it unnecessary to store data of an unrequired portion of the character image, which enables the capacity of the memory device to be saved.

As described above, the tape printing apparatus 1 is capable of forming a partial image by setting both a conversion mode and an image-forming range within which the partial image is to be formed, and converting, out of character codes corresponding to character images to be arranged within a resulting whole image, each character code corresponding to a character image part or whole of which is contained in the image-forming range, based on outline font data, according to the set or determined conversion mode. In the following, a partial image-forming process will be described in further detail based on an example of the enlarged image-printing.

First of all, the printing process will be described with reference to FIG. 7. In the example described herein, the enlargement ratio n=4 is set as mentioned hereinabove, and hence so-called enlarged image-printing is carried out.

Figure 7:
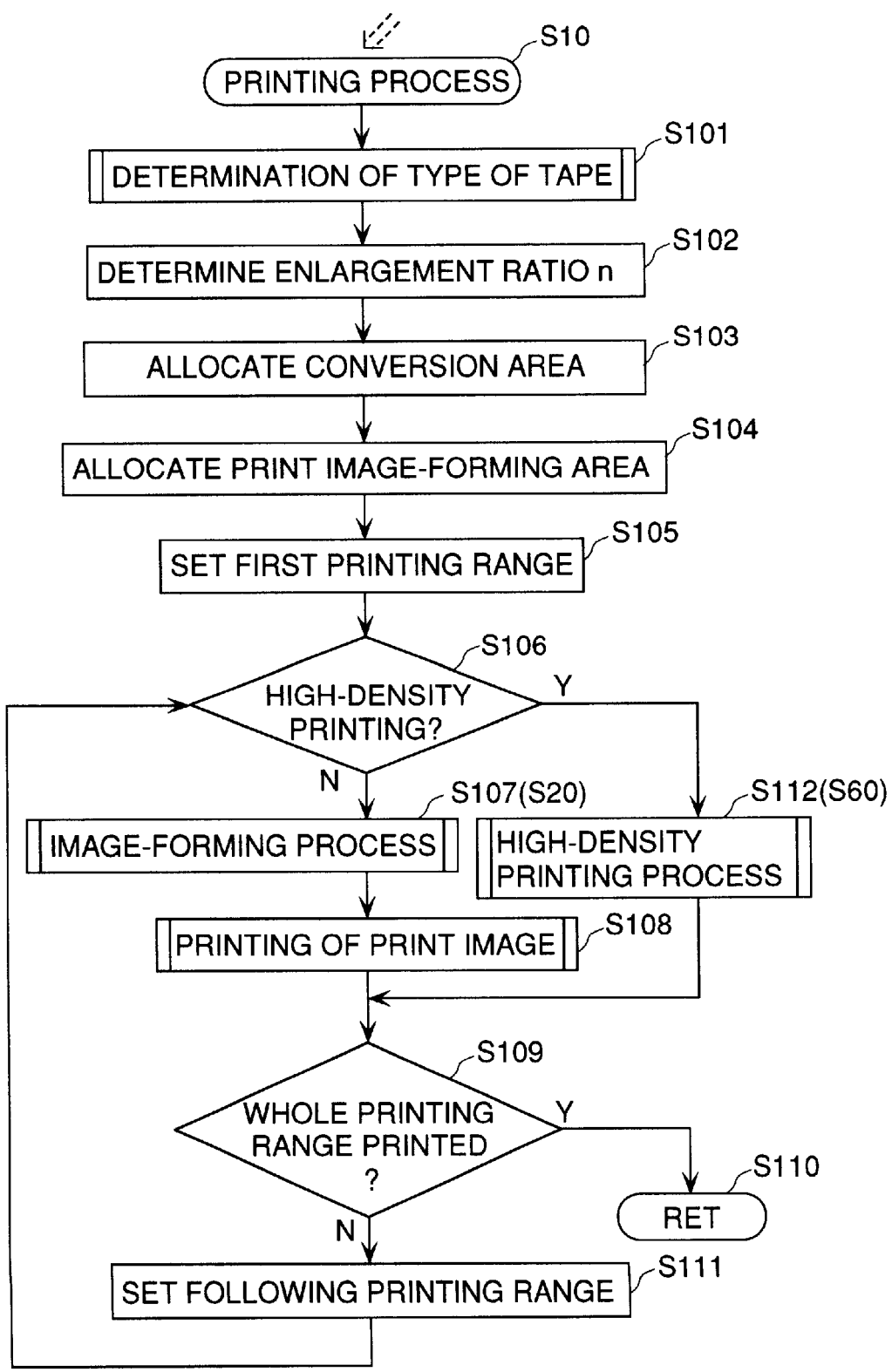
FIG. 7 is a flowchart showing a printing process.

When the user depresses the print key 322, an interrupt by the print key is generated, as described above, to start the printing process, and, as shown in FIG. 7, first, at step S101, the type of the tape T is determined in response to information signals (detection signals) from the tape-discriminating sensor 142 described hereinabove with reference to FIG. 3. This makes it possible to determine the tape width Tw of the tape T loaded in the apparatus, thereby determining the sizes of the split images G1 to G4, described above with reference to FIG. 5B, that is, the vertical sizes of the partial images. It should be noted that the process at step S101 may be omitted, when there is provided only one type of tape width Tw of the tape T, for instance, and accordingly there is no need to determine the type of the tape T.

After determining the type of the tape T (S101), the enlargement ratio n set as described above is determined or read in at step S102 (n=4 in the above-mentioned example). It should be noted that if the normal printing mode is set, the enlargement ratio n=1 is set, and hence, in this case, the enlargement ratio n=1 is determined or read in.

After determination of the enlargement ratio n (S102), then, at step S103, a character image conversion/storage area is allocated in the print image data area 244 described above with reference to FIG. 3. Here, as described above with reference to FIG. 6C, a conversion area having a width n=4 times as large as the normal (reference) size thereof and a length as large as the reference size thereof, that is, a conversion area n (=4)×1 times as large as the reference size is allocated.

It should be noted that when a fixed size character image conversion/storage area is to be allocated regardless of the enlargement ratio n, it may not be necessarily allocated here. The same can be allocated in advance to omit the step S103. Further, the step (S103) can be also omitted when data representative of a character image is converted from the character code and directly stored in the following print image-forming area, as described hererinbelow.

Further, in the following description, it is assumed that the size (character size) of a character image data of which is converted from the character code at the enlargement ratio n is represented e.g. by (length×width=) nh×nv, so as to make a more generalized description. That is, it is assumed here that a conversion area is allocated which has a size large enough to store data of part (1/nv of the vertical size) of a character image which is nh×nv times as large as the reference size (nh (=4)×(nh×1/nh)=4×1).

After allocating the character image conversion/storage area (S103), next, at step S104, similarly to the character image conversion/storage area, the print image-forming area is allocated in the print image data area 244, described above with reference to FIG. 3. Here, an area is allocated, which has a size large enough to sequentially form or store the split images G1 to G4, described above with reference to FIG. 5B. More specifically, an area is allocated for storing data representative of an image having a horizontal size obtained by multiplying the horizontal size of nh (=4) times as large as the reference size plus two halves of an inter-character blank space size allocated respectively forward and backward of the character image by the number of characters (for instance, the number of characters of the illustrated character string "AB . . . "), and a vertical size within the tape width Tw (that is, a vertical size within which a 1/nv of the character image which is nv times as large as the reference size (nh×1/nh=1) can be printed.

It should be noted that when an area for forming fixed-size printing data is allocated, the step S104 can be omitted, similarly to the case of the conversion area for fixed size character. Further, when data of a character image is converted from its character code and directly stored in the print image-forming area, it is also possible to use the whole of the print image data area 244, described above with reference to FIG. 3, as the print image-forming area. In this case as well, the present step can be omitted, since the area to be used is allocated or secured in advance.

After the print image-forming area is allocated (S105), a first (initial) printing range is set at step S105. Here, the range of the split image G1, described above with reference to FIG. 5B, is set as the first printing range.

After setting the first printing range at step S105, it is determined at step S106 whether or not high-density printing is to be carried out (whether or not high-density printing has been set). Since the high-density printing will be described in detail hereinbelow, description is made here assuming that the high-density printing is not set (No to S106).

When the high-density printing is not carried out (No to S106), next, at step S107, data of an image of the FIG. 5B split image G1 is formed as that of a partial image to be printed in the set printing range. This image-forming process (S107) as well will be described hereinafter with reference to FIG. 8 et. seq., and hence let it be simply assumed here that data of the FIG. 5B split image G1 is formed as data of a print image.

After completion of the image-forming process (S107), a print image formed (the split image G1 in this example) is printed on the tape T at step S108.

After the print image is printed (S108), then, it is determined at step S109 whether or not the whole printing range has been printed, that is, printing of all the split images G1 to G4 to be printed has been completed. Here, since only the split image G1 has been printed, and printing of the whole printing range has not yet been completed (No to S109), next, the range of the split image G2 is set as the following printing range at step S111.

After setting the following (second in the present case) printing range (S111), the same processes (S106, S107 and S108) as carried out for the first printing range are carried-out, and then, it is determined again (S109) whether or not the whole printing range has been printed. Since the printing of the whole printing range has not yet been completed (No to S109), the range of the split image G3 is set as a subsequent printing range at step S111. Then, similarly, the split image G3 is printed (S106 to S111). After printing the split image G4 (S106 to S108), it is now determined that the whole of the printing range has been printed (Yes to S109), followed by terminating the overall printing process (S10) at step S110.

Although in the above example, the printing range, that is, the image-forming range is automatically set, the tape printing apparatus 1 may be configured such that the user can designate the image-forming range as a range for a partial image of a whole image, as he desires, during a screen display process.

As described above, in the tape printing apparatus 1, the partial conversion mode as the conversion mode includes the enlarged image mode, and the fully-converting conditions include the condition of the whole of an enlarged image being set to the image-forming range. In other words, also in the enlarged image mode in which an enlarged image is set to a whole image, if the whole of the enlarged image is not required (when the fully-converting conditions are not fulfilled), only a required portion of the enlarged image may be formed as a partial image. Therefore, in the tape printing apparatus 1, data of only a required portion of an enlarged character image is converted (partially converted) from the character code, whereby it is made unnecessary to store data of an unrequired portion of the character image, which enables the capacity of the memory device to be saved.

In the following, the image-forming process at step S107 in FIG. 8 will be described in detail with reference to FIG. 8. As described above, according to the tape printing apparatus 1, part or whole of a whole image can be created as a partial image, not only when it is formed as a print image (image to be printed), but also when it is formed as a display image (image to be displayed), and the image-forming process for forming the display image is the same as that for forming the print image (the same process is started as a subroutine). Hence, the following description is made without discriminating a print image from a display image, simply assuming that an image (partial image) in an image-forming range is formed.

Figure 8:
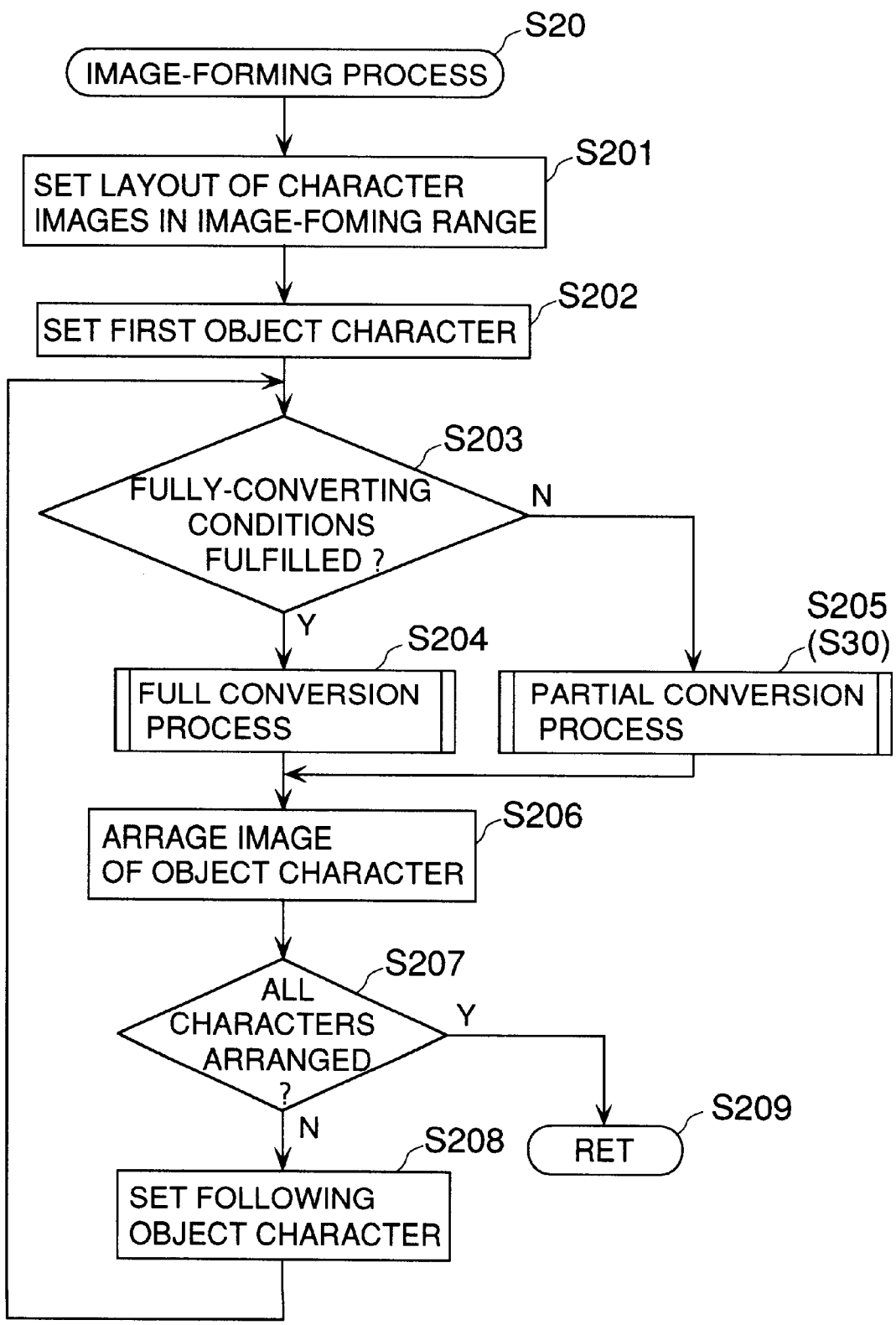
FIG. 8 is a flowchart showing an image-forming process.

Referring to FIG. 8, in the image-forming process (S20: started (called) at S107 or the like), first of all, the layout of each character image in the image-forming range is set at step S201. More specifically, as to each character image part or whole of which is in the image-forming range, the layout thereof in a partial image is set or determined by taking into account (calculating) the enlargement ratio n, etc. (S201). This layout-setting process includes setting of the size of the character image and an arrangement area for arranging the same. In the example illustrated in FIGS. 5A and 5B, the layout of each character image, such as "A" and "B", in a partial image, including the size of each character image and an arrangement area therefor, is set at step S201 (for instance, after setting the first printing range described above with reference to FIG. 7, layout of each character image in the split image G1 is set).

In the example of the split images G1 to G4 illustrated in FIG. 5B, data of all the character images, such as "A" and "B", are partially converted from respective character codes. In another case when character images "ABCDE", "FGHIJ", "KLMNO", . . . are laid out on a first line, second line, a third line, . . . , respectively, if all the character images "ABCDE" on the first line are included in the split image G1, and the character images "FGHIJ" on the second line have an upper half thereof included in the split image G1 and a lower half thereof included in the split image G2, while the character images "KLMNO" on the third line are all included in the split image G2, data of all the character images "ABCDE" on the first line are converted from respective character codes in a full conversion mode, and data of the character images "FGHIJ" on the second line are partially converted from the respective character codes in the partial conversion mode, while data of the character images "KLMNO" on the third line are converted from the respective character codes in the full conversion mode. Of course, when character sizes of character images on respective lines are different from each other and accordingly a cut line e.g. between the split image G1 and the split image G2 is formed at a different position from the above example, data of the character images are converted from the respective character codes in the full conversion mode or the partial conversion mode in a manner adapted to the different position of the cut line.

After setting the layout of each character image in the image-forming range (the partial image) (S201), a first (initial) object character is set at step S202. In the present case, first of all, as the initial object character, the character "A" is set.

After the first object character is set (S202), it is determined at step S203 whether or not data of the whole of the object character image can be converted from its character code and at the same time can be arranged in the arrangement area therefor, that is, whether or not the fully-converting conditions are fulfilled.

One of the fully-converting conditions is that data of the whole of an individual character image to be converted from its character code is required for forming a partial image and at the same time can be arranged in the arrangement area for arranging the character image. Therefore, it is determined according to the results of the above layout-setting process (S201), that the fully-converting conditions are not fulfilled (No to S203), when the whole of the character image is not required for forming the partial image or cannot be arranged in the arrangement area therefor.

That is, when the above fully-converting conditions are not fulfilled, data of the whole of the character image is converted from its character code in vain, and hence only data of a portion thereof, which is to be arranged in the arrangement area and required for forming the partial image, is converted form the character code (partial conversion process (S205) described hereinafter), whereby the capacity of the memory device can be saved or reduced.

The other condition of the fully-converting conditions is that data of the whole of an individual character image can be converted from its character code and stored in a conversion area (the character image conversion/storage area in the printing process described above e.g. with reference to FIG. 7). Therefore, when data of the whole of the character image cannot be converted from its character code or stored in the conversion area, the fully-converting conditions are not fulfilled (No to S203). Hence, by converting data of only a portion permitted to be converted, from its character code (the partial conversion process (S205) described hereinafter), it is possible to reduce the capacity of the memory device.

In other words, if the conversion area is normally allocated, for instance, in a manner adjusted to the size of a character image repeatedly used, it is not required to secure an extra area only for storing each enlarged character image after the conversion from the character code, which is less frequently formed. This makes it possible to reduce the capacity of the memory device. Further, when data of a character image of a size larger than that of the conversion area is to be stored, the partial conversion process (S205) may be carried out to store the same. Since such a case does not occur so frequently, it does not present a critical problem to overall processing speed and the like of the apparatus.

As described above, it is determined at step S203 whether or not data of the whole of an image of the object character can be converted from its character code and at the same time can be arranged in the arrangement area therefor (whether or not the fully-converting conditions are fulfilled). Then, if it is determined that these conditions are fulfilled (Yes to S203), the full conversion process is carried out based on an outline font at step S204, thereby storing data of the whole object image fully converted from its character code in the conversion area (the character image conversion/storage area in the printing process, for instance). Then, at step 206, according to the results of the above layout-setting process (S201), the whole character image of the object character is arranged in the arrangement area (for instance, an arrangement area in the print image-forming area in the printing process).

On the other hand, as shown in the examples of the split images G1 to G4 described above with reference to FIG. 5B, when an image of the whole object character converted from its character code cannot be stored in the conversion area or arranged in the arrangement area therefor (when the fully-converting conditions are not fulfilled) (No to S203), the partial conversion process is carried out based on the outline font at step S205, thereby partially converting its character code to store only a required portion of the image of the object character in the conversion area. Then, at step 206, according to the results of the layout-setting process (S201), part (the required portion) of the character image is arranged in the arrangement area therefor.

After the character image of the object character is arranged (S206), it is determined at step S207 whether or not all the characters have been arranged, that is, when the split image G1 (in the first image-forming range) described above with reference to FIG. 5B is created, for instance, it is determined whether or not all the characters in the character string "AB . . . " have been arranged. In the present case, only the arrangement of the character "A" has been completed but all the characters have not yet been arranged (No to S207). Hence, next, the character "B" is set as a following object character at step S208.

After setting the following object character "B" (S208), similarly to the case of the first object character, it is determined at step S203 whether or not an image of the whole of the object character can be converted from its character code and stored in the conversion area, and at the same time whether or not the image can be arranged in the arrangement area therefor and then, the full conversion process (S204) or the partial conversion process (S205) is carried out to obtain an image of the object character "B" (in the example illustrated in FIG. 5B, the partial conversion process (S205) is carried out). Next, the character image of the object character is arranged in the arrangement area therefor at step S206, and it is determined at step S207 whether or not images of all the characters have been arranged. If images of all the characters have not yet been arranged (No to S207), the following object character (character code) is set at step S208 to carry out the same loop (S203 to S206). Thereafter, when it is determined that all the characters have been arranged (Yes to S207), the overall image-forming process (S20) is terminated.

As described above, in the image-forming process (S20), a single character image to be converted from its character code has a required portion thereof converted from the same and stored in a conversion area (the above character image conversion/storage area, for instance) and the data stored in the conversion area is arranged in a corresponding arrangement area (e.g. the print image-forming area). The above processes are repeatedly carried out by the number of character codes to be converted, whereby a partial image can be formed.

It should be noted that when a character image is converted from its character code and directly stored in the print image-forming area, the character image can be directly arranged by the full conversion process or partial conversion process at the preceding step S204 or S205, so that the character image-arranging process (S206) can be omitted. Further, since the condition concerning the character image conversion/storage area is not involved in the fully-converting conditions in this case, it is only determined at step S203 whether or not an image of the whole object character can be arranged in the arrangement area therefor. In this case, since a required portion of a single character image to be converted from its character code is converted and directly stored in a corresponding arrangement area, it is possible to reduce the capacity of the memory device as well as form a partial image by repeatedly carrying out this conversion process by the number of character codes to be converted.

Further, when a normal printing operation is carried out (for instance, in the case described above with reference to FIG. 6D), the FIG. 8 image-forming process carries out a full conversion process on all the characters at step S204, but it is also possible to set a portion required for forming a partial image to the whole of a character image, and thereby employ the partial conversion process at step S205. Similarly, the determination (S203) as to whether or not an image of the whole of each object character can be converted from its character code and stored in the conversion area and at the same time whether or not the image can be arranged in the arrangement area therefor as well as the full conversion process (S204) may be omitted to carry out the partial conversion process (S205) on all the characters.

Although in the above description, the character image conversion/storage area and the print image-forming area in the printing process were taken as examples, in the screen display process, a similar character image conversion/storage area and a display image-forming area are allocated in the display image data area 243 described hereinabove with reference to FIG. 3. Of course, it is also possible to directly convert a character code to a character image for storage in the display image-forming area. In this case, the whole display image data area 243 can be used as the display image-forming area.

As described above, according to the tape printing apparatus 1, when a partial image is to be formed, the layout of each character image arranged in the partial image including the settings of the size of the character image and an arrangement area for arranging the same is set. In the partial conversion mode, such as the enlarged image-printing mode or the like, a required portion of each character image is converted from a corresponding character code based on an outline font and arranged in the arrangement area in a predetermined partial image data-forming area, whereby it is possible to create an attractive partial image in the predetermined partial image data-forming area. Further, the capacity of the memory device can be saved by partially converting the character code to obtain only the required portion of the character image.

If the partial conversion range is set to the whole of each character image in the partial conversion process (S205), as, described above, the partial conversion process (S205) can be substituted for the full conversion process (S204), and further, in the image-forming process (S20) as well, the full conversion process (S204) can be dispensed with. Hence, in the following, description of the full conversion process (S204) is omitted, and the partial conversion process (S205) will be described in detail.

Figure 9:
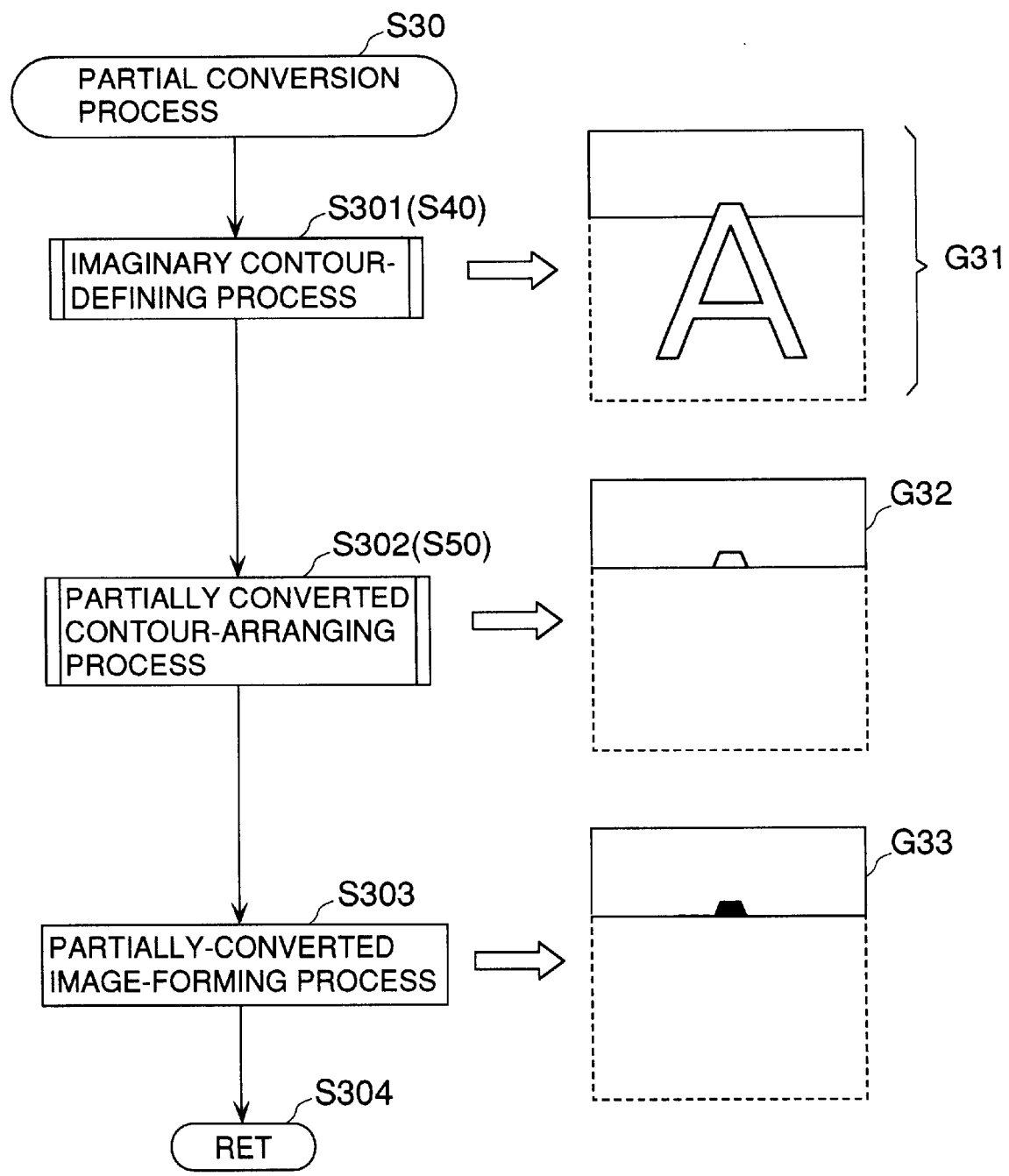
FIG. 9 is a flowchart showing a partial conversion process, together with character images formed at respective steps appearing in the flowchart.

Referring to FIG. 9, in the partial conversion process (S30) which is called (i.e. started) at S205 or the like, first, based on the outline font for converting a single character (character code) to data representative of a character image (corresponding to the character code), contour lines to be formed assuming that the whole of the character image is converted from the character code, are defined as imaginary contour lines at step S301.

In other words, each character image is represented by contour lines formed by the coordinates of several reference points and the attributes of lines (straight lines or curves) connecting the reference points to each other, and an outline font is defined by the coordinates of the several reference points and the attributes of the lines (see FIGS. 12 and 13). Therefore, here, assuming that data of the character image G31 of the character "A" shown in FIG. 9, for instance, is converted from its character code, the contour lines of the whole character image G31 are defined as imaginary contour lines at step S301.

Figure 10:
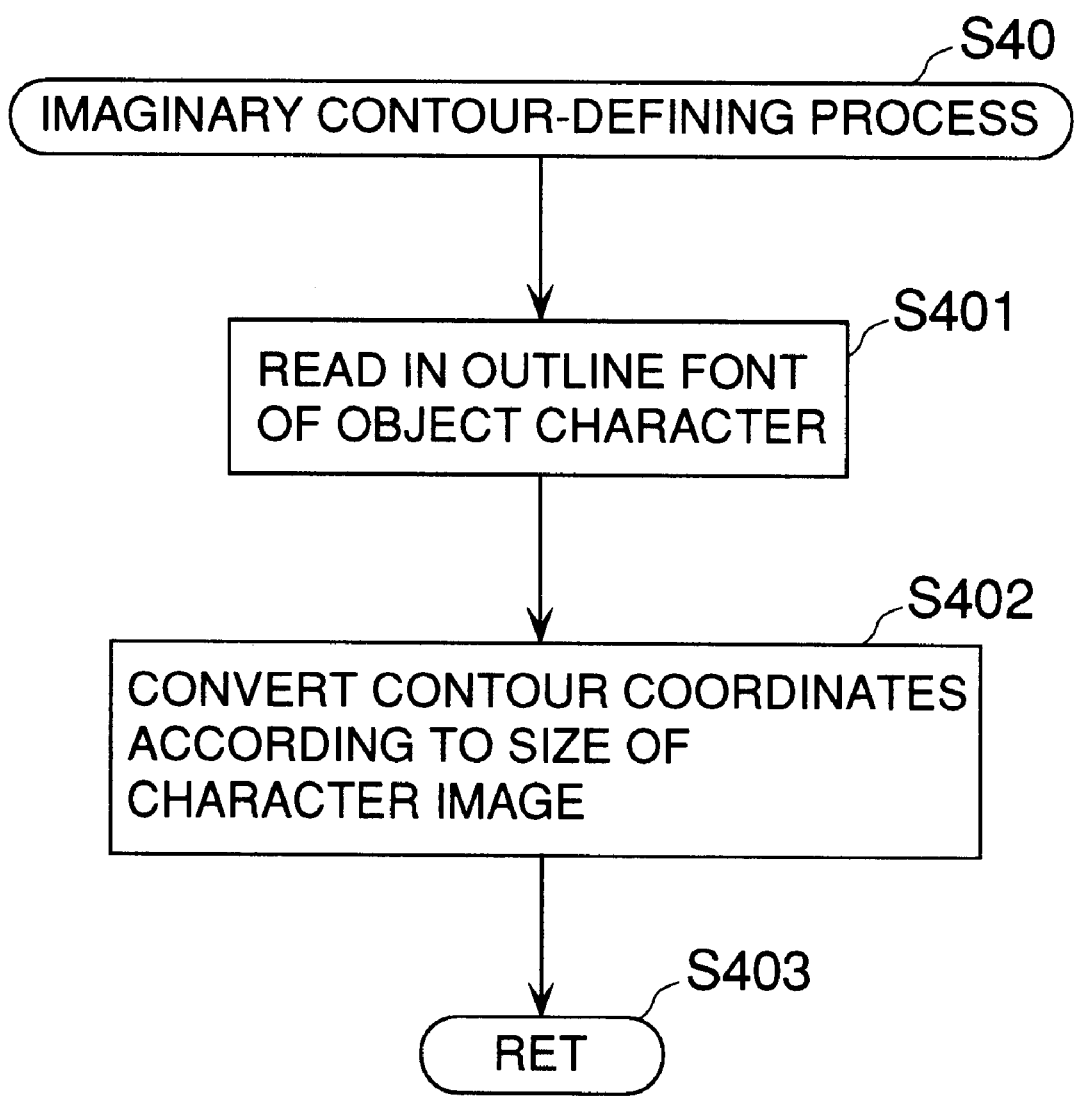
FIG. 10 is a flowchart showing an imaginary contour-defining process.

More specifically, as shown in FIG. 10, in an imaginary contour-defining process (S40) which is called (i.e. started) at S301 or the like, to define imaginary contour lines, the outline font based on which a single character code is converted to data of a character image (for instance, the character image G31 of the character "A") is read in at step S401, and contour coordinates included in the outline font are converted (scaled: S402) according to the size of the character image which was set in the layout-setting process, followed by terminating the imaginary contour-defining process (S40) at step S403. This makes it possible to define the contour lines of a character image formed by the conventional normal conversion (the full conversion) as imaginary contour lines.

As shown in FIG. 9, after terminating the imaginary contour-defining process (S301), out of the imaginary contour lines, only contour lines included in the partial conversion range which forms a required portion of data of the single character image to be converted from the character code, are determined to be actual contour lines, and actual contour pixels for forming the actual contour lines are arranged at step S302. Only contour lines included in the partial conversion range as shown by a character image G32 of the character "A" in the figure, for instance, are discriminated as actual contour lines to arrange actual contour pixels forming the actual contour lines.

Figure 11:
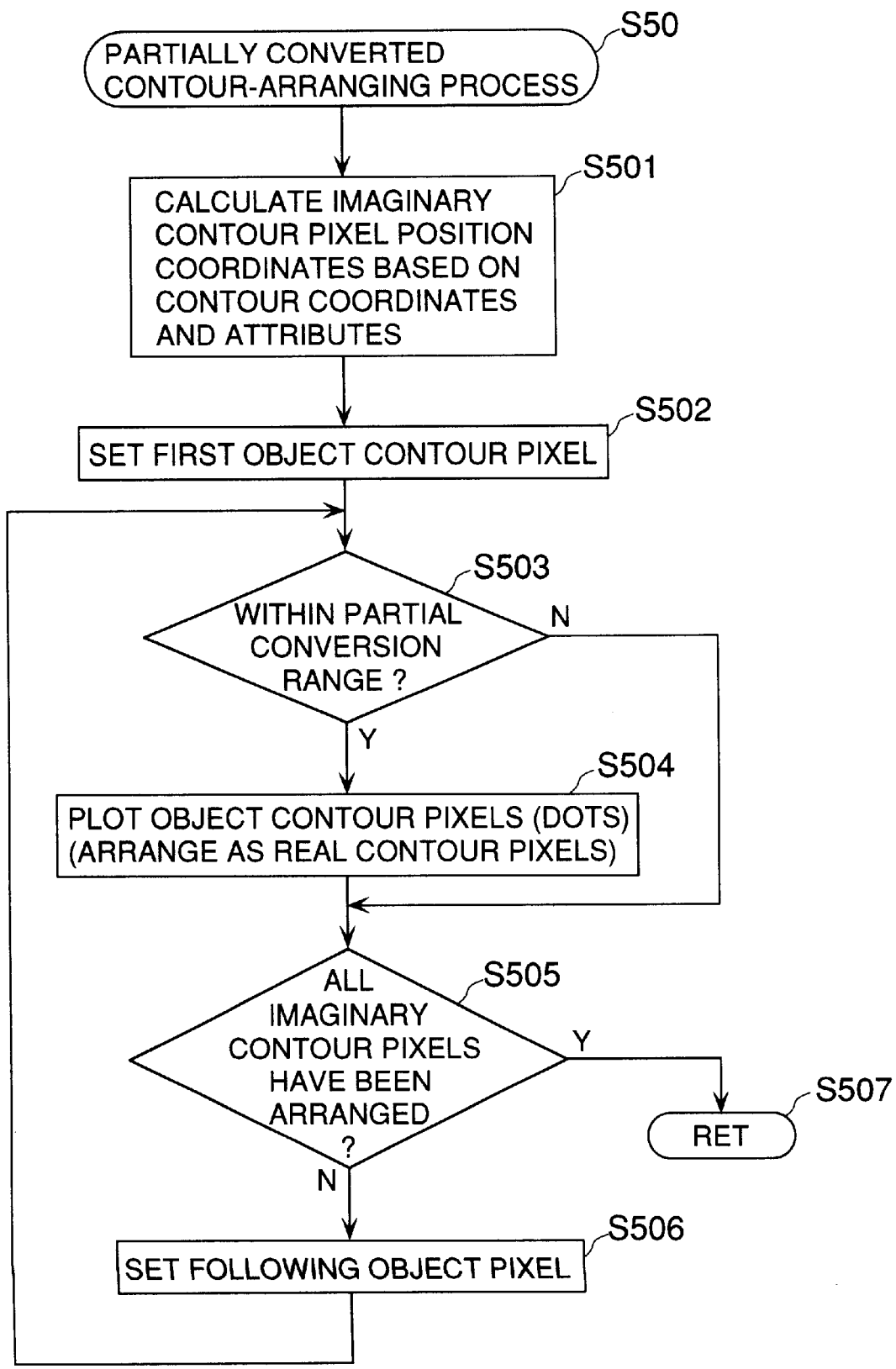
FIG. 11 is a flowchart showing a partially converted contour-arranging process.

More specifically, referring to FIG. 11, in a partially converted contour-arranging process (S50), which is called (i.e. started) at S302 or the like, first, as to each of imaginary contour pixels for forming imaginary contour lines, the position coordinates thereof in a conversion area (the above character image conversion/storage area, for instance) or in an arrangement area (e.g. the above print image-forming area or display image-forming area) for directly arranging the required portion of the character image are calculated at step S501 based on the contour coordinates and attributes defining the imaginary contour lines. That is, based on the data of the contour coordinates of several reference points forming contour lines after scaling and the attributes of lines (straight or curved lines) connecting the reference points to each other, the dot positions of pixels (imaginary contour pixels) of the contour lines between the reference points are each calculated as position coordinates.

After calculating the position coordinates of each of the imaginary contour pixels (S501), first, a first object contour pixel is set at step S50. Then, it is determined at step S503 whether or not the set first object contour pixel is within the partial conversion range, that is, whether or not the same is a pixel required in the partial image. If it is determined that the same is a required pixel (actual contour pixel) (Yes to S503), the plotting (the arrangement) of the pixel is carried out at step S504, whereas if it is determined that the initial object contour pixel is not an actual contour pixel (No to S503), the same is left as it is (i.e. the same is not plotted or arranged). Thereafter, it is determined at step S505 whether or not the above determination plotting process is carried out on all the imaginary contour pixels.

When the determination plotting has not yet been carried out on all the imaginary contour pixels (No to S505), a following object contour pixel is set at step S506 to carry out the same loop as described above (S503 to S505). When the determination plotting has been carried out on all the imaginary contour pixels (Yes to S505), the overall partially converted contour-arranging process (S50) is terminated at step S507. It should be noted that the above position coordinate-calculating process (S501) on imaginary contour pixels may be carried out on a part-by-part basis instead of effecting the same beforehand on all the imaginary contour pixels. That is, first, the position coordinate-calculating process (S501) is carried out on a first part of the imaginary contour pixels, to thereafter perform the subsequent processes (S502 to S506). Then, the same processes (S501 to S506) are carried out on a second part of the imaginary contour pixels. If the processes (S501 to S506) are repeatedly carried out to finally calculate the position coordinates of each of all the imaginary contour pixels, it is possible to reduce the capacity of the memory device for storing the results of the calculations.

As described above, in the partially converted contour-arranging process (S50), in order to arrange actual contour pixels, position coordinates of each of imaginary contour pixels forming imaginary contour lines are calculated based on the contour coordinates and attributes of lines defining the imaginary contour lines. Then, it is determined whether or not the position coordinates of each imaginary contour pixel are within the partial conversion range. Imaginary contour pixels whose position coordinates are determined to be within the partial conversion range are arranged as the actual contour pixels forming actual contour lines at positions defined by the position coordinates. Therefore, it is possible to arrange the actual contour pixels forming the actual contour lines of a partially converted character image formed by partially converting the character code corresponding to the character image.

Referring to FIG. 9, after terminating the partially converted contour-arranging process (S302), pixels are arranged at a portion surrounded by the actual contour pixels (of the FIG. 9 character image G32 of the character "A", for instance), whereby an image comprised of arranged pixels including the actual contour pixels is formed as the partially converted image of the character image (e.g. a FIG. 9 partially converted image G33 of the character "A") at step S303, followed by terminating the overall partial conversion process (S30) at step S304.

As described above, in the partial conversion process (S30), to convert a single character code to data of a required portion of a character image to which the single character code corresponds, contour lines to be formed when data of the whole of the character image is converted from the character code are defined as imaginary contour lines based on an outline font. Out of the imaginary contour lines, only contour lines included in the partial conversion range are determined as actual contour lines to arrange actual contour pixels for forming the actual contour lines. Then, pixels are arranged in a portion surrounded by the actual contour pixels to form a partially converted image of the character image, whereby only the required portion of the character image can be partially converted from the corresponding character code based on the outline font.

Further, according to the tape printing apparatus 1, a selected one of conversion modes is set, and at the same time an image-forming range of the whole image which is to be formed as a partial image is set. Then, out of character images to be arranged when the whole image is formed, data of each character image part or whole of which is contained in the image-forming range is converted and arranged based on an outline font, according to the set or determined conversion mode, whereby it is possible to create the partial image.

In this case, since the outline font is used, it is possible to form an attractive partial image. Further, if one of at least one partial conversion mode is set as the conversion mode, when the fully-converting conditions, which include one that the whole of a character image to be converted from a character code is required for forming a partial image, for instance, are not fulfilled, only data of a required portion of the character image is converted (partially converted), whereby it is made unnecessary to store data of an unrequired portion of the character image, which enables the capacity of the memory device to be saved or reduced.

Now, whole images cannot be necessarily created based on the outline font. For instance, when registered nonstandard characters or registered images are contained in a whole image as image elements thereof (including character images or the like), each of the image elements is normally registered in the form of a dot matrix and cannot be formed based on the outline font. Therefore, if the enlarged image of the whole image is desired to be obtained, it is impossible to directly arrange data of image elements enlargingly converted from character codes based on the outline font (by converting (scaling) the contour coordinates thereof). Further, this inevitably makes it impossible to create partial images of the image elements based on the outline font.

As described above, when a whole image of a normal (reference) size cannot be formed based on the outline font, to obtain a desired image (basic image), such as an enlarged image or the like, it is required to create the desired image based on a dot matrix (including a dot font), as described hereinbefore under the heading of Prior Art. More specifically, when a desired image (basic image) is to be formed by enlargement or reduction of image elements, it is required to enlarge or reduce each image element of a dot matrix, arrange the same, and thereafter smooth the arranged image element, or alternatively to enlarge or reduce each image element smooth the same, and then arrange the smoothed image element. However, in these cases, even if each image element is smoothed, it is difficult to obtain an image more attractive than one formed based on the outline font.

Therefore, in the tape printing apparatus 1, to obtain an attractive print image having smoother curved portions than one formed by the prior art even in the above-mentioned cases, the aforementioned high-density printing mode is provided, which can be selected on the print format selection screen.

More specifically, when the option "high-density printing" is selected from the menu options in the state of the above "print format" selection screen being displayed, the high-density printing mode is set, and a selection screen for selecting high-density ratio m is displayed to permit the high-density ratio m to be input. It should be noted that the high-density printing mode can be set in combination with the normal printing mode or the enlarged image-printing mode, described above. When the high-density printing mode is set in combination with the normal printing mode, the high-density ratio m can be set with the enlargement ratio n=1, whereas when the high-density printing mode is set in combination with the enlarged image-printing mode, the high-density ratio m can be set with the enlargement ratio n=a set value (n=4 in the above example).

When an option "2", for instance, is selected from the menu options of 1, 2, 3, 4, and 6 in the state of the high-density ratio selection screen being displayed, numeral 2 is set to the high-density ratio m. Further, the tape printing apparatus 1 may be configured such that similarly to the case of the enlargement ratio n being set, described hereinbefore, any of the above numerical options may be input as the high-density ratio m by depressing a corresponding number key of the number key group 313.

When the high-density ratio m (m=2, for instance) is input, a message that the high-density ratio m=2 is set is displayed. To cancel the input instruction, the cancel key 326 is depressed to make a new selection. If the setting of high-density ratio m=2 is approvable, by depressing the selection key 323, the high-density ratio m=2 is finally determined and set. Then, the format-selecting process is terminated to display the text entry screen as the basic screen, followed by returning to the key entry wait state (No to S3).

The above high-density ratio m is determined in relation to the print head (the thermal head) 7, a tape-feeding speed for feeding a tape T, a strobe pulse applied by the head driver 272 of the driving block 270 to drive the print head 7, and split pulses of the strobe pulse.

The tape printing apparatus 1 uses a thermal head having heating elements of 256 dots as the print head 7 and is capable of setting the number of split pulses to a maximum of 6 (to any of 1, 2, 3, 4 and 6) in a manner adapted to the tape-feeding speed monitored by the rotational speed sensor 141, a dot number printable on the tape T having the tape width Tw and the like.

For instance, when 256 dots can be printed in the direction of the tape width Tw, one strobe pulse is applied to the thermal head 7 according to the tape-feeding speed, thereby applying two split pulses thereto. Accordingly, odd-numbered 128 dots of the 256 dots can be printed by a first split pulse, while the remaining even-numbered 128 dots can be printed by a second split pulse. That is, it is possible to print 128 dots×2 (steps)=256 dots. Similarly, 256 dots×1 (step)=256 dots, 64 dots×4 (steps)=256 dots, and so forth.

Similarly, when 192 dots can be printed in the direction of the tape width Tw, for instance, it is possible to print 192 dots×1 (step) (hereinafter, the terms "dot(s)" and "step(s)" are omitted), 96×2, 64×3, 48×4 and 32×6.

Further, e.g. when 192 dots can be printed in the direction of the tape width Tw, as described above, if the high-density ratio m=2 is set, 192 dots are printed twice during a time period over which the tape T is advanced by one dot in the direction of feeding thereof, that is, 192 dots are printed once per time period over which the tape T is advanced by a half dot in the direction of feeding thereof, and printing dot density in the direction of feeding of the tape T is multiplied by m=2.

In the following, the printing process, more particularly, the high-density printing will be described with reference to FIG. 7. As described above, since the enlargement ratio n=4 and the high-density ratio m=2 are set, an enlarged image with a size (horizontal size (in the direction of feeding of the tape T)×vertical size (in the direction of the width of the tape T=)) nh×nv times=4×4 times as large as that of the whole image of the reference size is set as a basic image. Then, the basic image is further expanded in the direction of feeding of the tape T by m=2 (that is, the whole image is expanded by (nh×m)×nv=(4×2)×4=8×4) to form a high-density printing basic image of which the high-density printing is carried out at the high-density ratio m=2.

As described hereinbefore, when the user depresses the print key 322, the interrupt by the print key is generated to start the printing process, and after completing processing from the determination of the type of the tape T (S101) up to the setting of the first printing range (S105), it is determined at step S106 whether or not the high-density printing mode is set.

If the high-density printing mode is not set (No to S106), the program proceeds to execute the loop starting with the image-forming process (S107), as described above. That is, after carrying out the image-forming process (S107), the printing of the print image (S108), the determination of whether or not the a whole printing range has been printed (S109), the setting of the following printing range (S111), and the determination of whether or not the high-density printing mode is set (S106) are carried out. If the high-density printing mode is set (Yes to S106), a loop is carried out in which a high-density printing process (S112), the determination of whether or not the whole printing range has been printed (S109), the setting of a following printing range (S111), and the determination of whether or not the high-density printing mode is set (S106). When it is determined (S109) that the whole printing range has been printed (Yes to S109), the overall printing process (S10) is terminated at step S110.

It should be noted that as clearly shown in FIG. 7, if it is possible to select for each printing range (for a split image) whether or not the high-density printing is to be carried out, to set the selection as the printing mode for the printing range, the printing is executed according to the setting.

Figure 14:
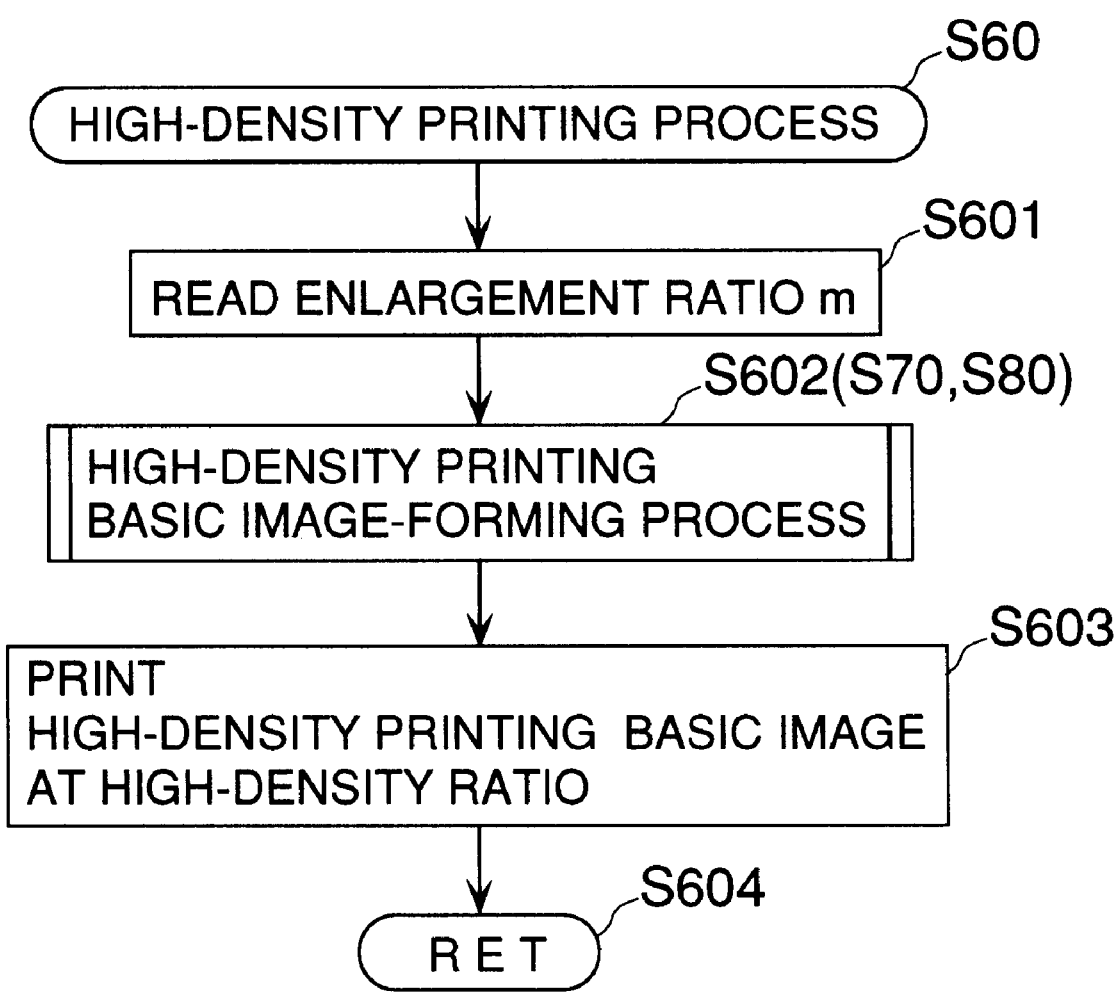
FIG. 14 is a flowchart showing a high-density printing process.

Next, the above high-density printing process (S60: called, which is started at S112 or the like, will be described in detail with reference to FIG. 14. As shown in the figure, when the high-density printing process (S60) is started, first, the high-density ratio m (m=2 in the present example) is determined at step S601. Then, a high-density printing basic image-forming process is carried out at step S602, and a high-density printing basic image produced is subjected to the high-density printing at step S603, followed by terminating the present process (S60) at step S604.

In the high-density printing (S603) for printing a high-density printing basic image, as described above, the high-density printing basic image with a size (nh×m)×nv times= 8×4 times as large as that of the whole image is subjected to the high-density printing carried out at m=2, in which 192 dots are printed once during a time period over which the tape T is fed by a half dot in the direction of feeding thereof.

Therefore, the high-density printing basic image formed in the high-density printing basic image-forming process (S602) has a horizontal dot size (in the direction of feeding of the tape T) m (m=2, for instance) times as large as that of the basic image formed by arranging one or more image elements. For instance, a basic image (enlarged image) with a size nh×nv times (4×4 times, for instance) as large as that of the above reference-size whole image has a horizontal dot size (nh times=4 times as large as that of the above reference-size whole image) thereof expanded by a factor of m (=2), to thereby form a high-density printing basic image (with a size (nh×m)×nv times=8×4 times as large as the reference-size whole image).

In general, so-called smoothing processing is required for smoothing jagged curved portions of a print image. When a print image has such a curved portion, if the print image is smoothed after enlargement by a factor of m in a predetermined direction (the direction of feeding of the tape T, in this example) and printed at a high-density ratio m, it is possible to obtain a printed image having an identical print size but smoother curved portions.

Figure 15:
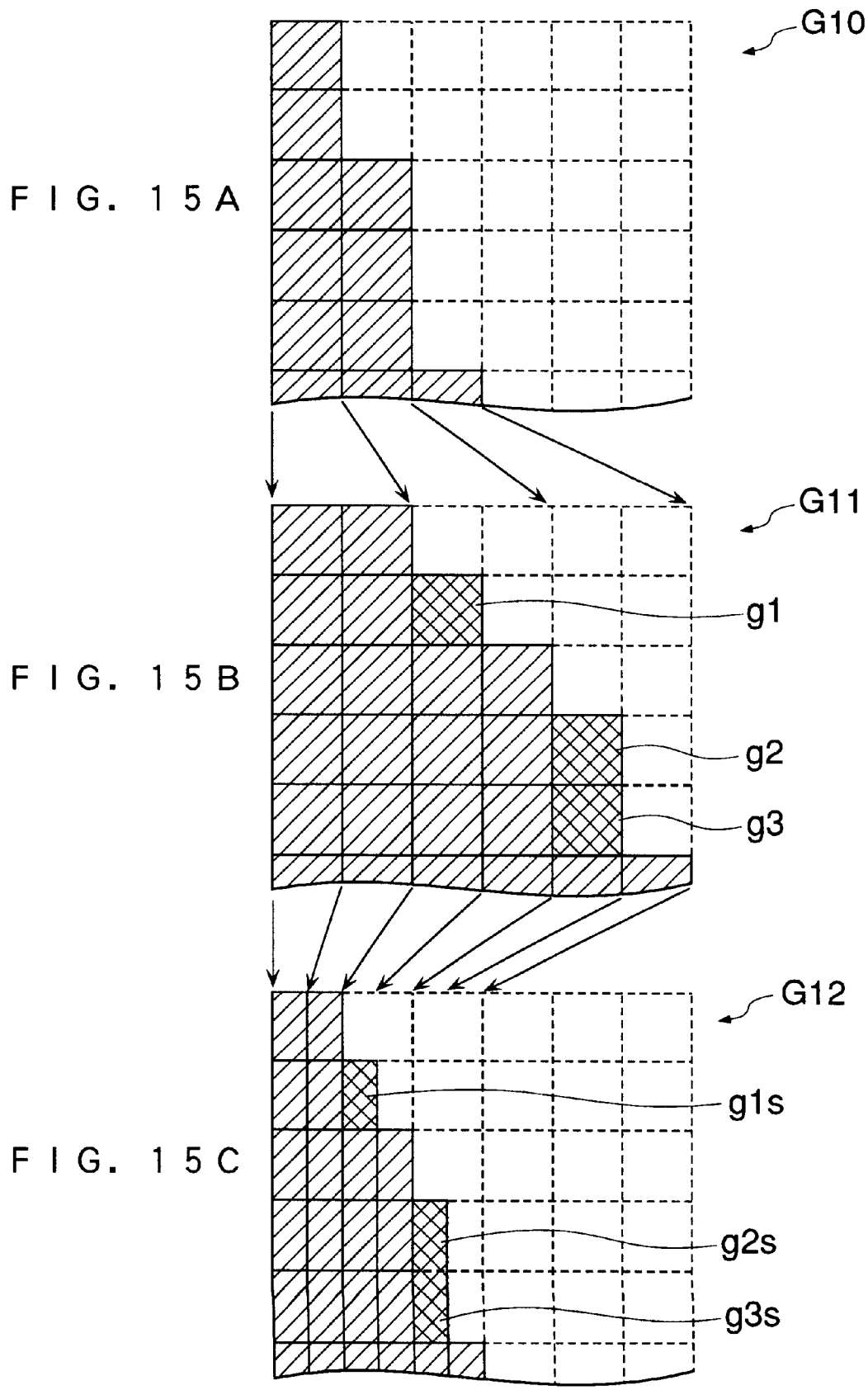
FIGS. 15A to 15C are diagrams showing schematic representations of dot images, which are useful in explaining the principle of the FIG. 14 high-density printing process.

Referring to FIGS. 15A to 15C, for instance, when part of the contour line of a curved portion of an arbitrary image G10 is formed by pixels whose dot coordinates vary such that as one of the two-dimensional coordinates in a predetermined one (predetermined direction) of the vertical and horizontal directions changes by one dot (by a value corresponding to one dot, the other of the same in the other direction changes by two dots (by a value corresponding to the dots) (see FIG. 15A), if the dot size of the pixel in the predetermined direction is magnified by a factor of two, the dot coordinates of the pixels come to vary such that the one of the coordinates changes by two dots in the predetermined direction per change of two dots in the other of the same in the other direction (see FIG. 15B).

In this case, if the smoothing process is carried out such that as the one of the dot coordinates first changes by one dot in the predetermined direction, the other changes by one dot in the other direction, and then, as the one changes by one dot, the other changes by one dot, that is, as the one changes by one dot twice in the predetermined direction, the other changes by one dot per time in the other direction to change through a total of two dots (FIG. 15B pixel g1 is added), the contour line of the curved portion can be smoothed.

If a high-density printing basic image G11 (see FIG. 15B) formed in the above manner is printed in the predetermined direction at the high-density ratio m=2, the resulting print image G12 (see FIG. 15C) is printed through addition of a pixel g1s of a half dot such that as the one of the dot coordinates first changes by a half dot in the predetermined direction, the other changes by one dot in the other direction, and as the one changes a second time by a half dot, the other changes by one dot. As a result, it becomes possible to draw a smoother curved portion in a print size of one dot in the predetermined direction. Actually, each dot (each pixel) is printed in a manner overlapping by a half dot, whereby it looks as if the curved portion is printed by a half dot in the predetermined direction. But, now, the print image is illustrated in a simplified manner as if it is printed by a half dot.

Similarly, for instance, assuming that as one of the dot coordinates of a pixel forming the contour line of a curved portion of the arbitrary image G10 changes by one dot in a predetermined one (predetermined direction) of the vertical and horizontal directions, the other of the dot coordinates of the pixel changes by three dots in the other direction (see FIG. 15A), if the dot size of the pixel in the predetermined direction is magnified by a factor of two, it is possible to change the other of the dot coordinates by three dots in the other direction as the one of the dot coordinates by two dots in the predetermined direction.

In this case, the smoothing process is carried out such that as the one of the dot coordinates first changes by one dot in the predetermined direction, and the other changes by one dot in the other direction, and then, as the one changes by one dot, the other changes by two dots to thereby change through three dots in total (pixels g2 and g3 appearing in FIG. 15B are added), whereby the contour line of the curved portion can be smoothed.

If the high-density printing basic image G11 (see FIG. 15B) formed in the above manner is printed in the predetermined direction at the high-density ratio m=2, the resulting print image G12 (see FIG. 15C) is printed through addition of pixels g2s and g3s of a half dot such that as the one of the dot coordinates changes by a half dot in the predetermined direction, the other changes by one dot in the other direction, and as the one changes a second time by a half dot, the other changes by two dots. As a result, it becomes possible to draw a smoother curved portion in a print size of one dot in the predetermined direction.

As described above, according to the tape printing apparatus 1, in printing even a basic image, which is formed by scaling the size of a whole image including, as image elements, thereof not only character images data of which is convertible from the character codes based on the outline font but also images of nonstandard characters or the like each registered in the form of a dot matrix, in short, in printing even a basic image which requires smoothing, a high-density printing basic image with its dot size in a predetermined direction m times as large as that of the basic image (m is a natural number equal to or larger than 2) is formed, and then, in a print size identical to that of a print image to be obtained by printing the basic image, the high-density printing basic image is printed, in the predetermined direction at a high-density ratio m, whereby it is possible to obtain an attractive print image having smoother curved portions than a print image formed by using the conventional method and device.

Figure 18A:
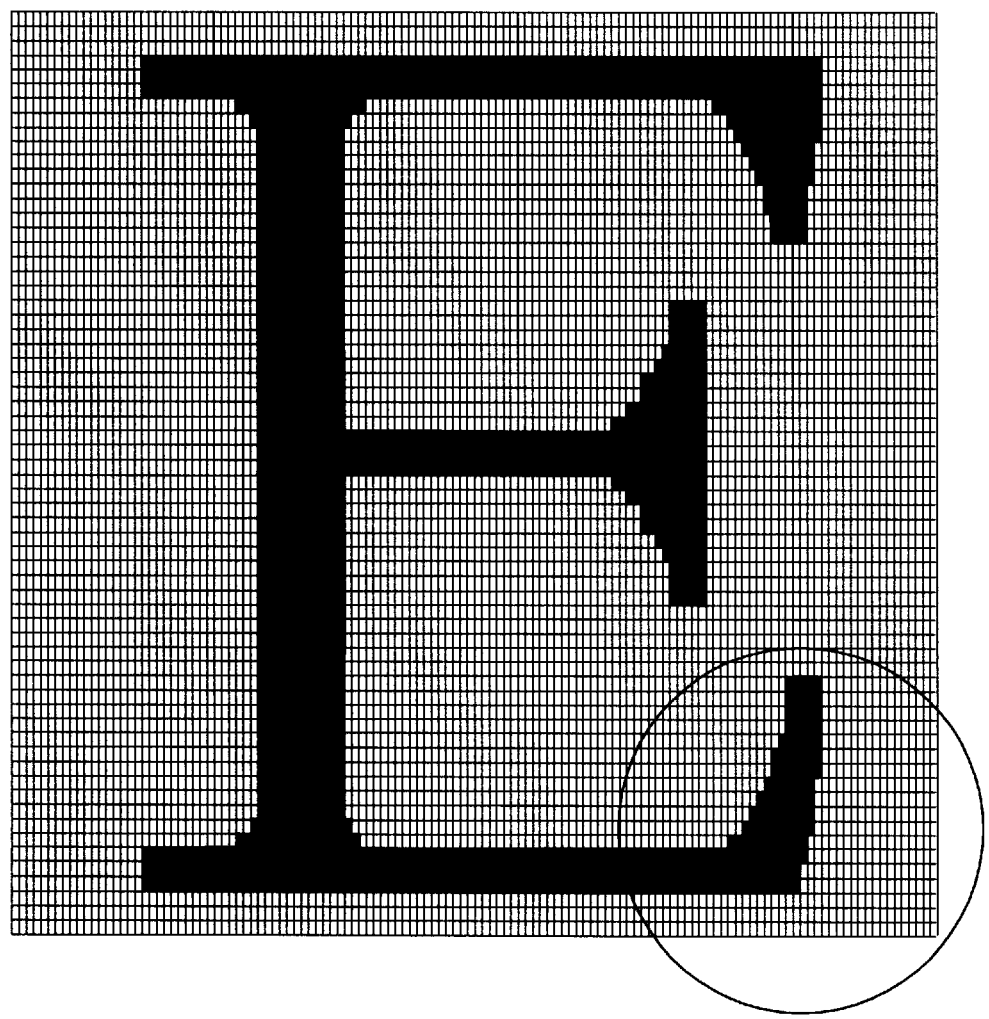
FIG. 18A is a diagram showing an example of a print image formed by the high-density printing process.
Figure 18B:
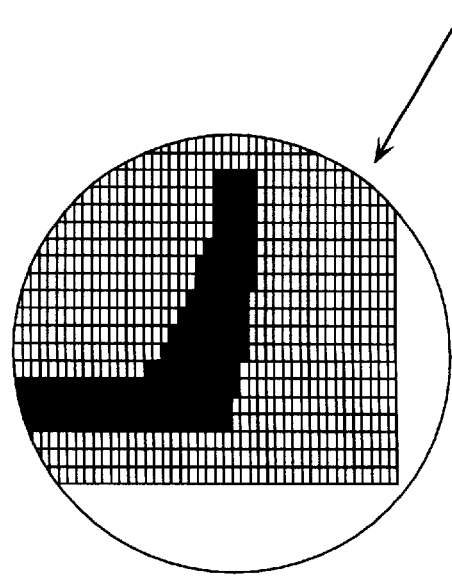
FIG. 18B is an enlarged partial view of the FIG. 18A print image.
Figure 19A:
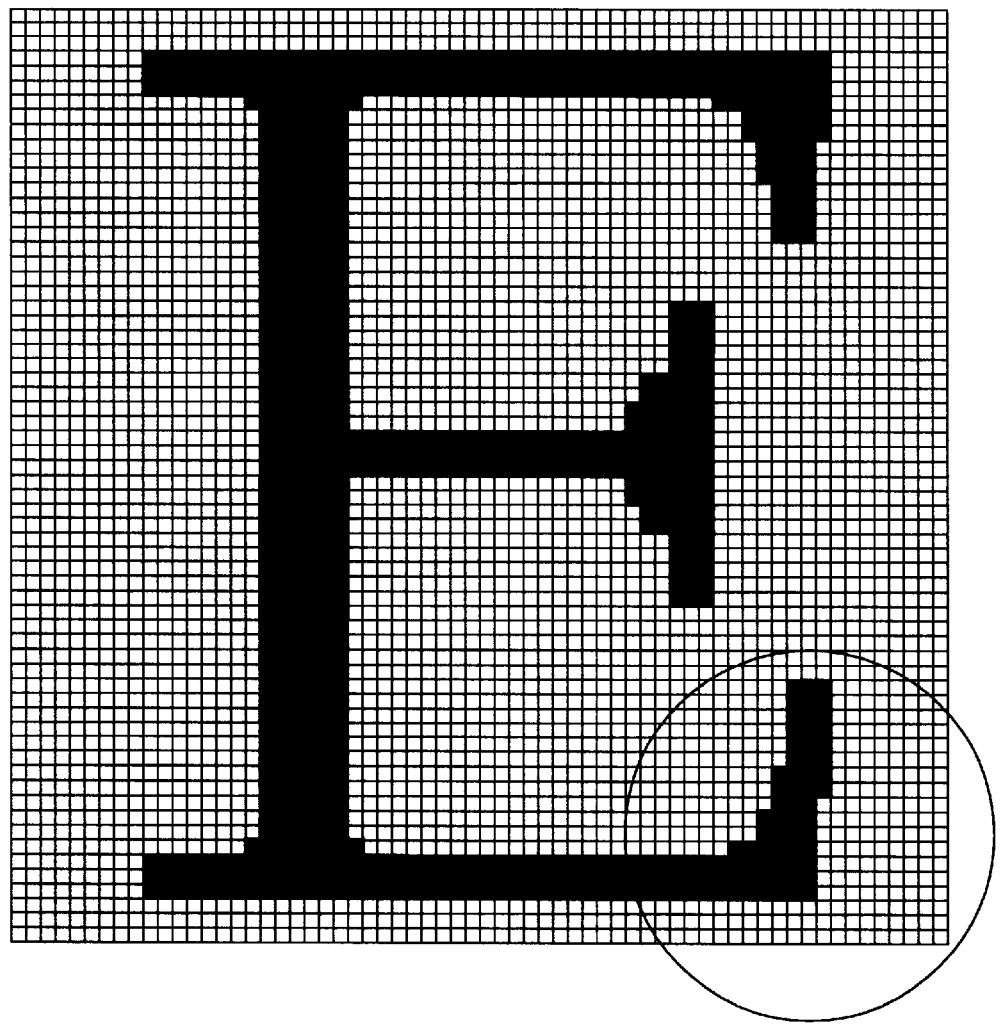
FIG. 19A is a diagram showing an example of a print image corresponding to FIG. 18A, which is formed when the high-density printing is not carried out.
Figure 19B:
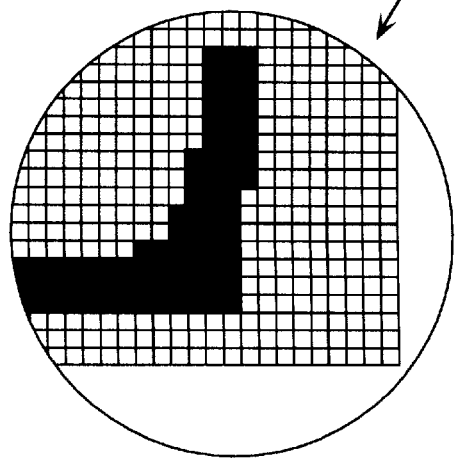
FIG. 19B is an enlarged partial view of the FIG. 19A print image.

In the tape printing apparatus 1, whether or not the creation of the high-density printing basic image and the printing at the high-density ratio m are to be carried out is determined according to whether or not the high-density printing mode is set, and hence, the high-density printing for obtaining a more attractive print image can be carried out as required. Although in the above example, the high-density printing mode was set in combination with the enlarged image-printing mode, this is not limitative, but when the high-density printing mode is set in combination with the normal printing mode, if only the enlargement ratio n=1 is set, that is, for instance, if only a basic image is formed to have a size nh×nv times=1×1 time as large as that of the above whole image of the reference size (if only the basic image is formed to have the same size as that of the reference-size whole image), the high-density printing can be basically carried out by executing the same process as carried out in the enlarged image-printing mode, whereby similarly to the case where the high-density printing mode and the enlarged image-printing mode are set in combination, it is possible to obtain an attractive print image having smoother curved portions (see FIGS. 18A and 18B) than a print image formed without setting the high-density printing mode (see FIGS. 19A and 19B).

Figure 16:
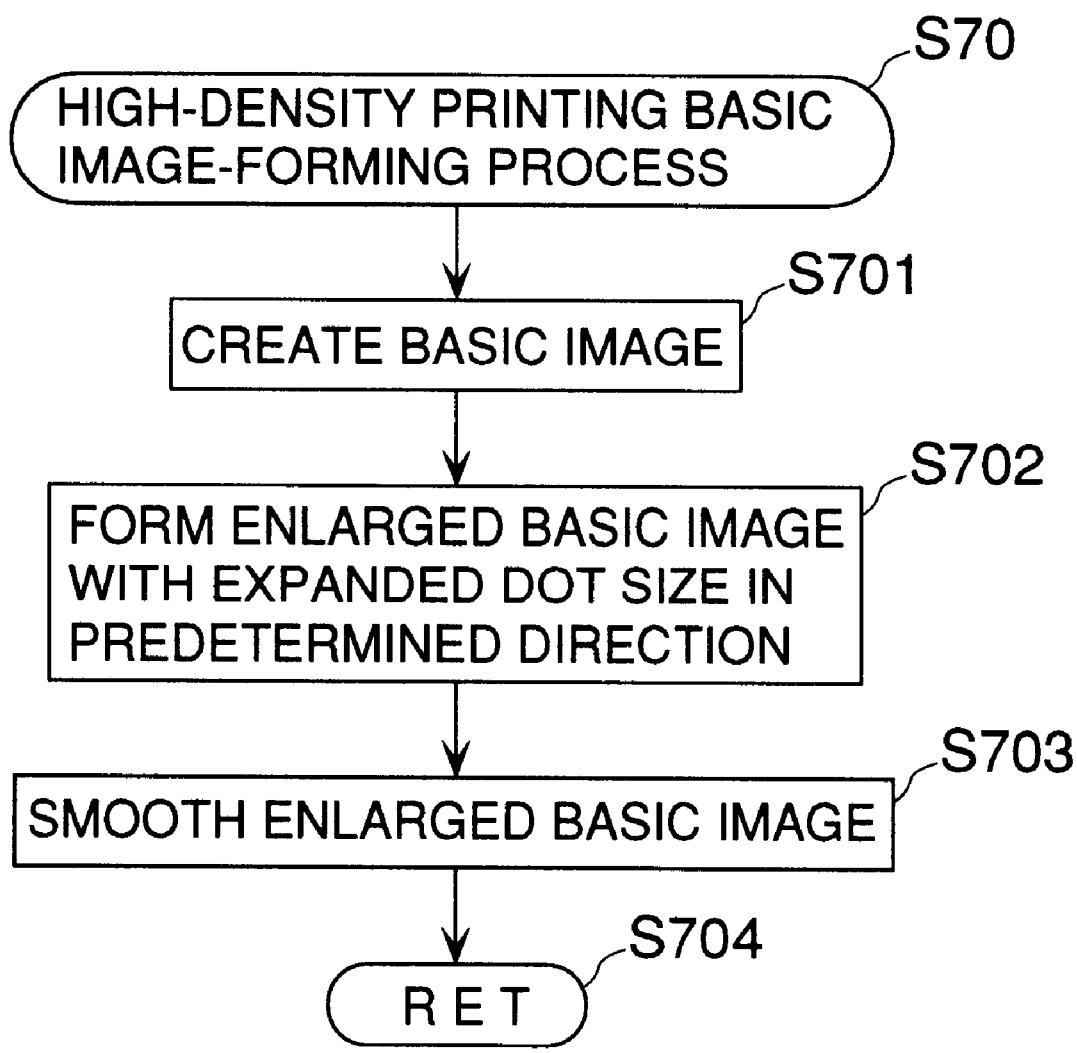
FIG. 16 is a flowchart showing an example of a high-density printing basic image-forming process.

Next, the above the high-density printing basic image-forming process (S70), which is called (i.e. started) at S602 or the like will be described with reference to FIG. 16. As shown in the figure, when the high-density printing basic image-forming process (S70) is started, first, a basic image is created at step S701, and then an enlarged basic image with a dot size in a predetermined direction (the direction of feeding of the tape T in this example) m times as large as that of the basic image is formed at step S702. After smoothing the enlarged basic image at step S703, the overall high-density printing basic image-forming process (S70) is terminated at step S704. This makes it possible to produce a high-density printing basic image with the dot size in the predetermined direction m times as large as that of the basic image.

Further, in the above example, when the whole image includes, as image elements thereof, images of registered nonstandard characters or the like each registered in the form of a dot matrix, a basic image in a dot matrix is first uniformly produced (S701), then an enlarged basic image with a dot size in the predetermined direction m times as large as that of the basic image is formed (S702), and the smoothing of the enlarged basic image (S703) is carried out. However, when there are image elements including a character image or the like data of which is convertible from character codes based on an outline font, it is also possible to employ the outline font to convert the character codes to such image elements.

Figure 17:
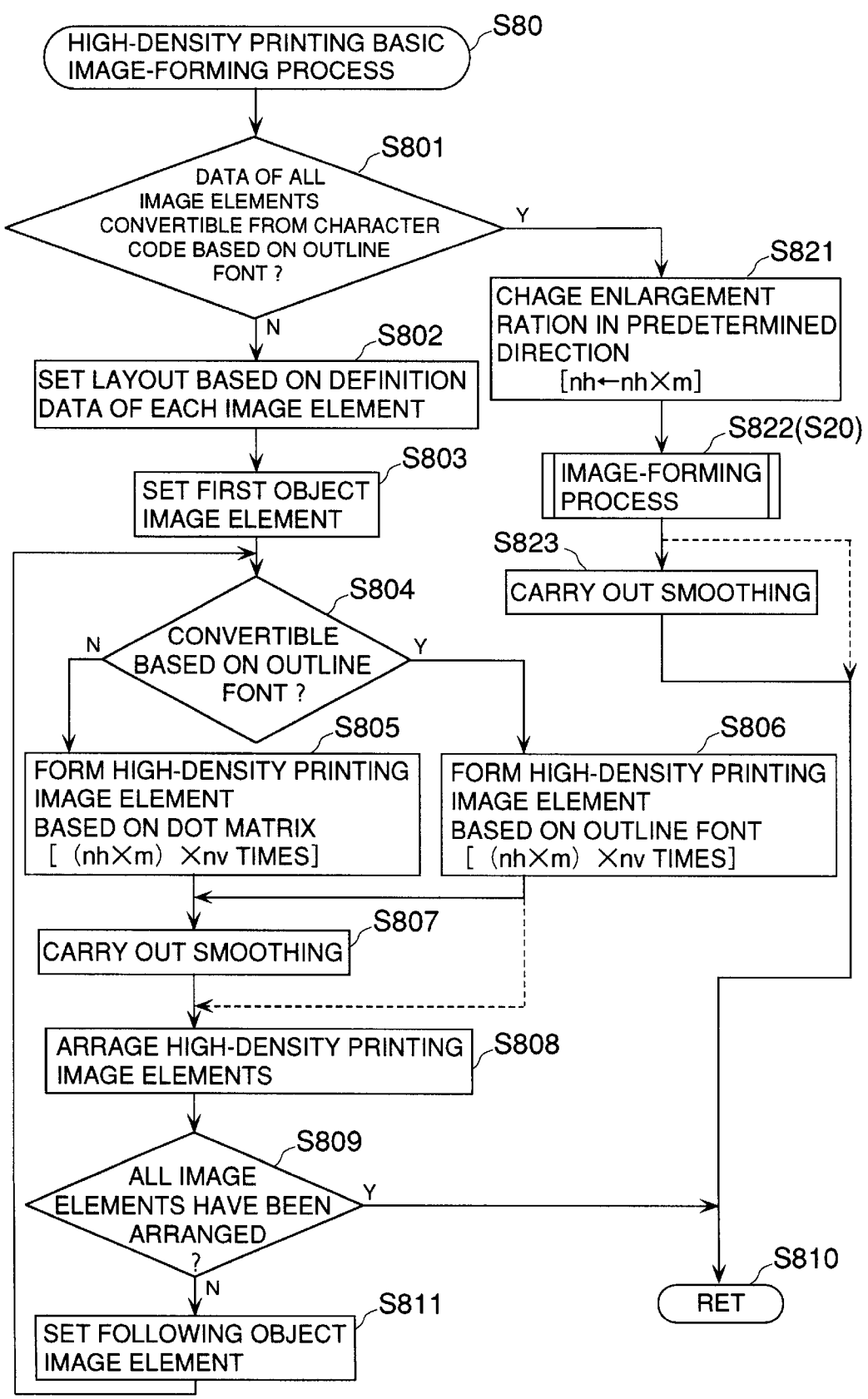
FIG. 17 is a flowchart showing another example of the high-density printing basic image-forming process.

In the above case, as shown in FIG. 17, when the high-density printing basic image-forming process (S80), which is called (i.e. started) at step S602 or the like, is started, first, it is determined at step S801 whether or not data of each of all the image elements can be converted from its character code based on an outline font. When data of all the image elements can be converted based on the outline font (Yes to S801), to carry out the image-forming process (S20) described above with reference to FIG. 8, the enlargement ratio in a predetermined direction (the direction of feeding of the tape T in this example) is changed at step S821. In the above example, for instance, the basic image has a size nh×nv times=4×4 times as large as that of the reference-size whole image, and the high-density ratio=2 is set, so that the setting of the enlargement ratio is changed to (nh×m)×nv=8×4.

After changing the enlargement ratio in the predetermined direction (nh×m) (S821), the above image-forming process (S20) is carried out at step S822 and the smoothing process is carried out as required (S823: this step can be omitted), whereby the high-density printing basic image is produced, followed by terminating the overall high-density printing basic image-forming process (S80) at step S810. This makes it possible to produce a high-density printing basic image with a dot size in the predetermined direction m times as large as that of the basic image.

On the other hand, if data of any of the image elements cannot be converted from character codes based on the outline font (No to S801), next, at step S802, the layout of each image element in a high-density printing basic image, including the settings of the size of the image element, an arrangement area therefor and the like, is set based on definition data (outline font or a dot matrix registered) of the element, by taking into account the enlargement ratio set to (nh×m)×nv=8×4.

After setting the layout of each image element (S802), a first object image element is set at step S803 and then, it is determined at step S804 whether or not the same is convertible from a corresponding character code based on the outline font.

When data of the object image element is not convertible based on the outline font (No to S804), that is, when the same is an image element registered in the form of a dot matrix (or based on a dot font), an image-enlarging process based on the dot matrix is carried out to thereby form a high-density printing image element with a size (nh×m)×nv times (e.g. 8×4 times) as large as the reference-size image element at step S805. Then, after carrying out the smoothing process at step S807, the high-density printing image element is arranged in a predetermined arrangement area according to the settings of the layout at step S808.

On the other hand, when data of the object image element is convertible from a corresponding character code based on the outline font (Yes to S804), that is, when the same is an image element formed based on the outline font, data of an enlarged image element with a size (nh×m)×nv times (e.g. 8×4 times) as large as the reference-size image element is converted from the character code based on the outline font to form a high-density printing image element at step S806. Then, after carrying out the smoothing process as required (S807: this step can be omitted), the high-density printing image element is arranged at a predetermined arrangement area according to the settings of the layout (S808).

After arranging the high-density printing image element formed from the object image element (S808), it is determined at step S809 whether or not all the image elements have been arranged. If all the image elements have not yet been arranged (No to S809), a following object image element is set at step S811, and the same loop as described above is carried out. That is, the determination of whether or not the following object image element (S804), the creation of a high-density printing image element based on a dot matrix or the outline font (S805 or S806), the smoothing process (S807), the arrangement of the high-density printing image element (S808) and the determination of whether or not all the image elements have been arranged are carried out (S809), and when it is determined that all the image elements have been arranged (Yes to S809), the overall high-density printing basic image-forming process (S80) is terminated at step S810.

As described hereinabove, in the high-density printing basic image-forming process (S80), the dot size in the predetermined direction of each image is increased by a factor of m, and if the expansion of the image is not effected based on the outline font, e.g. when an image element, such as an image of nonstandard characters or the like registered in the form of a dot matrix, is enlarged, the smoothing process is carried out on the image element to thereby form a high-density printing image element corresponding thereto. Then, the high-density printing image element corresponding to the image element, formed as above, is arranged in a manner adjusted to the layout of a high-density printing basic image, whereby it is possible to form a high-density printing basic image with a size in a predetermine direction m times as large as that of the basic image.

It should be noted that an image element, data of which can be converted from its character code based on the outline font, is enlargingly converted from the character code based on the outline font to create a high-density printing image element corresponding to the image element. In this case, since an attractive high-density printing image element is easily formed, the smoothing process can be dispensed with, unless otherwise required. In short, the smoothing process may or may not be carried out. Further, even if an object image element can be enlarged and converted from the character code based on the outline font for forming a high-density printing image element, once data of the object image element is formed or stored as an image element, it is in the form of a dot matrix. Hence, when such an image element is expanded, a high-density printing image element corresponding thereto is required to be smoothed, similarly to one corresponding to an image element data of which cannot be enlarged or converted from the character code based on the outline font.

Although in the above embodiment, an example of forming images for printing or display by using the tape printing apparatus id described, this is not limitative, but the image-forming method and device according to the invention can be applied to any device or apparatus or any kind of image-forming process, so long as it forms part or a whole of a whole image comprised of character images formed by conversion of character codes for characters, such as letters, numerals, symbols, and simple figures, to image data, based on outline font, and properly arranging the image data, e.g. a printing apparatus and a display device.

As described above, according to the image-forming method and device according to the invention, it is possible to form part or a whole of a whole image comprised of at least one character image formed by converting respective character code(s) to image data and arranging the image data, as an attractive image while saving the capacity of memory.

It is further understood by those skilled in the art that the foregoing is a preferred embodiment of the invention, and that various changes and modifications may be made without departing from the spirit and scope thereof.

What is claimed is:

1. A method of forming an image, comprising the steps of:
    defining a plurality of conversion modes to be selectively employed for converting character codes to character image data items each representative of a character image based on an outline font, said conversion modes including at least one partial conversion mode for carrying out conversion of each of said character codes such that only a required portion of each of said character image data items corresponding to said each of said character codes is obtained when at least one of at least one fully-converting condition peculiar to each of said conversion modes is not fulfilled in converting said each of said character codes,
    setting a selected one of said conversion modes to an actual conversion mode;
    setting an image-forming range in a whole image represented by whole image data to be created by converting at least one character code to character image data and arranging said character image data; and
    forming partial image data representative of part or a whole of said whole image by conversion of each character code in said actual conversion mode, said each character code belonging to said at least one character code and corresponding to character image data representative of a character image part or a whole of which lies within said image-forming range, and arrangement of image data resulting from said conversion within a predetermined partial image data-forming area.

2. A method according to claim 1, wherein said at least one partial conversion mode includes an enlarged image mode in which an enlarged image to be formed by enlarging at least one character image represented by said character image data corresponding respectively to said at least one character code is set to said whole image,
    said at least one fully-converting condition for said enlarged image mode including a condition that a whole of said enlarged image lies within said image-forming range.

3. A method according to claim 1, wherein said at least one partial conversion mode includes a partial image mode in which said partial image data is formed as data representative of said part of said whole image,
    said at least one fully-converting condition for said partial image mode including a condition that a whole of said whole image lies within said image-forming range.

4. A method according to claim 1, wherein the step of forming said partial image data includes the steps of:
    setting a layout of said part or said whole of said character image represented by said character image data corresponding to said each character code within said image-forming range, said layout including a size of said part or said whole of said character image within said image-forming range and an arrangement area for said part or said whole of said character image within said predetermined partial image data-forming area; and
    converting said each character code based on said outline font such that a required portion of said character image data representative of said character image is obtained, when a selected one of said at least one partial conversion mode is set, and arranging said required portion of said character image data in said arrangement area, to thereby form said partial image data within said predetermined partial image data-forming area.

5. A method according to claim 4, wherein said at least one fully-converting condition for said selected one of said at least one partial conversion mode includes a condition that as to said each character code, a whole of said character image data corresponding to said each character code is required to form said partial image data, and at the same time, said whole of said character image data can be arranged within said arrangement area.

6. A method according to claim 4, wherein the step of converting said each character code such that a required portion of said character image data representative of said character image is obtained, and arranging said required portion in said arrangement area includes the step of converting a single character code such that a required portion of character image data corresponding to said single character code is obtained, and directly arranging said required portion of said character image data within said arrangement area.

7. A method according to claim 4, wherein said partial image data-forming area contains a conversion area allocated for converting a single character code to character image data corresponding to said single character code and storing said character image data corresponding to said single character code therein;

the step of converting said each character code such that a required portion of said character image data representative of said character image is obtained, and arranging said required portion in said arrangement area includes the steps of:

converting said single character code such that a required portion of character image data corresponding to said single character code is obtained, and storing said required portion of said character image data corresponding to said single character code, in said conversion area; and arranging said required portion of said character image data stored in said conversion area, within said arrangement area.

8. A method according to claim 7, wherein said at least one fully-converting condition for said selected one of said at least one partial conversion mode includes a condition that said each character code can be converted such that a whole of said character image data representative of said character image corresponding to said each character code can be stored in said conversion area.

9. A method according to claim 6, wherein the step of converting a single character code such that a required portion of character image data corresponding to said single character code is obtained, and directly arranging said required portion of said character image data within said arrangement area includes the steps of:

defining a contour line of a whole of a character image represented by character image data to be formed from said single character code, as an imaginary contour line, assuming that said single character code is converted based on said outline font such that said whole of said character image represented by said character image data is obtained;

determining an actual contour line from said imaginary contour line, said actual contour line being part of said imaginary contour line within a partial conversion range defining a required portion of said character image data corresponding to said single character code, and arranging actual contour pixels forming said actual contour line; and arranging pixels within an area enclosed by said actual contour pixels to thereby form image data constituted by the arranged pixels including said actual contour pixels, as image data to which said single character code is partially converted.

10. A method according to claim 9, wherein the step of defining said contour line of said whole of said character image represented by said character image data to be formed includes the steps of:

reading data of said outline font corresponding to said single character code; and converting contour coordinates included in said read data of said outline font to ones adapted to said size of said part or said whole of said character image represented by said character image data corresponding to said single character code within said image-forming range, said size being included in said layout.

11. A method according to claim 9, wherein the step of determining said actual contour line and arranging said actual contour pixels forming said actual contour line includes the steps of:

calculating coordinates of a position of each of imaginary contour pixels forming said imaginary contour line based on contour coordinates and attributes defining said imaginary contour line;

determining whether or not said coordinates of said position of said each of said imaginary contour pixels are within said partial conversion range; and arranging each of ones of said imaginary contour pixels, of which said coordinates of said position are determined to be within said partial conversion range, in said position indicated by said coordinates, as said actual contour pixels forming said actual contour line.

12. A method according to claim 1, wherein said partial image data is formed as print image data representative of a print image to be printed on a printing object.

13. A method according to claim 12, wherein said printing object is a tape.

14. A method according to claim 1, wherein said partial image data is formed as display image data representative of a display image to be displayed on a display screen.

15. An image-forming device comprising:

outline font-storing means for storing an outline font;

conversion mode-defining means for defining a plurality of conversion modes to be selectively employed for converting character codes to character image data items each representative of a character image based on an outline font, said conversion modes including at least one partial conversion mode for carrying out conversion of each of said character codes such that only a required portion of each of said character image data items corresponding to said each of said character codes is obtained when at least one of at least one fully-converting condition peculiar to each of said conversion modes is not fulfilled in converting said each of said character codes;

conversion mode-setting means for setting a selected one of said conversion modes to an actual conversion mode;

image-forming range-setting means for setting an image-forming range in a whole image represented by whole image data to be created by converting at least one character code to character image data and arranging said character image data; and partial image data-forming means for forming partial image data representative of part or a whole of said whole image by conversion of each character code in said actual conversion mode, said each character code belonging to said at least one character code and corresponding to character image data representative of a character image part or a whole of which lies within said image-forming range, and arrangement of image data resulting from said conversion within a predetermined partial image data-forming area.

16. An image-forming device according to claim 15, wherein said at least one partial conversion mode includes an enlarged image mode in which an enlarged image to be formed by enlarging at least one character image represented by said character image data corresponding respectively to said at least one character code is set to said whole image, said at least one fully-converting condition for said enlarged image mode including a condition that a whole of said enlarged image lies within said image-forming range.

17. An image-forming device according to claim 15, wherein said at least one partial conversion mode includes a partial image mode in which said partial image data is formed as data representative of said part of said whole image, said at least one fully-converting condition for said partial image mode including a condition that a whole of said whole image lies within said image-forming range.

18. An image-forming device according to claim 15, wherein said partial image data-forming means includes:

layout-setting means for setting a layout of said part or said whole of said character image represented by said character image data corresponding to said each character code within said image-forming range, said layout including a size of said part or said whole of said character image within said image-forming range and an arrangement area for said part or said whole of said character image within said predetermined partial image data-forming area; and partial image data conversion/arrangement means for converting said each character code based on said outline font such that a required portion of said character image data representative of said character image is obtained, when a selected one of said at least one partial conversion mode is set, and arranging said required portion of said character image data in said arrangement area, to thereby form said partial image data within said predetermined partial image data-forming area.

19. An image-forming device according to claim 18, wherein said at least one fully-converting condition for said selected one of said partial conversion mode includes a condition that as to said each character code, a whole of said character image data corresponding to said each character code is required to form said partial image data, and at the same time, said whole of said character image data can be arranged within said arrangement area.

20. An image-forming device according claim 18, wherein said partial image data conversion/arrangement means includes partial conversion means for converting a single character code such that a required portion of character image data corresponding to said single character code is obtained, and directly arranging said required portion of said character image data within said arrangement area.

21. An image-forming device according to claim 18, wherein said partial image data-forming area contains a conversion area allocated for converting a single character code to character image data corresponding to said single character code and storing said character image data corresponding to said single character code therein;

said partial image data conversion/arrangement means includes:

partial conversion means for converting said single character code such that a required portion of character image data corresponding to said single character code is obtained, and storing said required portion of said character image data corresponding to said single character code, in said conversion area; and character image data arrangement means for arranging said required portion of said character image data stored in said conversion area within said arrangement area.

22. An image-forming device according to claim 21, wherein said at least one fully-converting condition for said selected one of said at least one partial conversion mode includes a condition that said each character code can be converted such that a whole of said character image data representative of said character image corresponding to said each character code can be stored in said conversion area.

23. An image-forming device according to claim 20, wherein said partial conversion means includes:

imaginary contour line-defining means for defining a contour line of a whole of a character image represented by character image data to be formed from said single character code, as an imaginary contour line, assuming that said single character code is converted based on said outline font such that said whole of said character image represented by said character image data is obtained;

actual contour pixels-arranging means for determining an actual contour line from said imaginary contour line, said actual contour line being part of said imaginary contour line within a partial conversion range defining a required portion of said character image data corresponding to said single character code, and arranging actual contour pixels forming said actual contour line; and partially-converted image data pixels-arranging means for arranging pixels within an area enclosed by said actual contour pixels to thereby form image data constituted by the arranged pixels including said actual contour pixels, as image data to which said single character code is partially converted.

24. An image-forming device according to claim 23, wherein said imaginary contour line-defining means includes:

outline font-reading means for reading data of said outline font corresponding to said single character code; and contour coordinates conversion means for converting contour coordinates included in said read data of said outline font to ones adapted to said size of said part or said whole of said character image represented by said character image data corresponding to said single character code within said image-forming range, said size being included in said layout.

25. An image-forming device according to claim 23, wherein said actual contour pixels-arranging means includes:

imaginary contour pixel position-calculating means for calculating coordinates of a position of each of imaginary contour pixels forming said imaginary contour line based on contour coordinates and attributes defining said imaginary contour line;

actual contour pixel-determining means for determining whether or not said coordinates of said position of said each of said imaginary contour pixels are within said partial conversion range; and actual contour pixel-arranging means for arranging each of ones of said imaginary contour pixels, of which said coordinates of said position are determined to be within said partial conversion range, in said position indicated by said coordinates, as said actual contour pixels forming said actual contour line.

26. An image-forming device according to claim 15, wherein said partial image data is formed as print image data representative of a print image to be printed on a printing object.

27. An image-forming device according to claim 26, wherein said printing object is a tape.

28. An image-forming device according to claim 15, wherein said partial image data is formed as display image data representative of a display image to be displayed on a display screen.

* * * * *